US010489845B2

(12) United States Patent
Mullakkara Azhuvath et al.

(10) Patent No.: US 10,489,845 B2
(45) Date of Patent: Nov. 26, 2019

(54) SYSTEM AND METHOD FOR PROVIDING CONTEXT DRIVEN HYPER-PERSONALIZED RECOMMENDATION

(71) Applicant: Tata Consultancy Services Limited, Mumbai (IN)

(72) Inventors: Rajeev Mullakkara Azhuvath, Kochi (IN); Sankaranarayanan Viswanathan, Chennai (IN); Narendran Sivakumar, Chennai (IN); Radhika Kannan, Chennai (IN); Rajish Radhakrishnan, Kochi (IN); Vishnu Madhu, Kochi (IN)

(73) Assignee: Tata Consultancy Services Limited, Mumbai (IN)

( * ) Notice: Subject to any disclaimer, the term of this patent is extended or adjusted under 35 U.S.C. 154(b) by 903 days.

(21) Appl. No.: 15/063,013

(22) Filed: Mar. 7, 2016

(65) Prior Publication Data

US 2016/0275594 A1 Sep. 22, 2016

(30) Foreign Application Priority Data

Mar. 20, 2015 (IN) .......................... 943/MUM/2015

(51) Int. Cl.
| | |
|---|---|
| *G06Q 30/00* | (2012.01) |
| *G06Q 30/06* | (2012.01) |
| *G06F 16/248* | (2019.01) |
| *G06F 16/9535* | (2019.01) |
| *G06F 16/2457* | (2019.01) |

(52) U.S. Cl.
CPC ....... *G06Q 30/0631* (2013.01); *G06F 16/248* (2019.01); *G06F 16/24578* (2019.01); *G06F 16/9535* (2019.01)

(58) Field of Classification Search
CPC .......... G06Q 30/0631; G06F 16/24578; G06F 16/9535; G06F 16/248
(Continued)

(56) References Cited

U.S. PATENT DOCUMENTS

| 8,510,247 B1 | 8/2013 | Kane, Jr. et al. |
| 9,672,537 B1 * | 6/2017 | Dietrich ............ G06Q 30/0271 |

(Continued)

FOREIGN PATENT DOCUMENTS

| EP | 2750417 | 7/2014 |
| WO | WO-2012/034606 | 3/2012 |

OTHER PUBLICATIONS

Ajmani et al.: "An ontology based personalized garment recommendation system," 2013 IEEE/WIC/ACM International Conferences on Web Intelligence (WI) and Intelligent Agent Technology (IAT); 4pgs. (Year: 2013).*
(Continued)

*Primary Examiner* — Robert M Pond
(74) *Attorney, Agent, or Firm* — Finnegan, Henderson, Farabow, Garrett & Dunner LLP

(57) ABSTRACT

The present disclosure discloses system and method for generating hyper-personalized recommendations from the enterprise and its partner/(s) product offerings space for the users based on dynamic persona creation, influenced by a dynamic context capture and context-chaining mechanism triggered by the past and current activities of a user or the time of occurrence of an event. The User data may be processed to generate a user persona, which may further vary dynamically based on his current and historic subscription/consumption/association data. The context trigger enables the system to generate recommendations even before the need relevant to the context is realized by the user. Thus, the system is capable of generating real-time dynamic, context-driven, hyper-personalized recommendations, based on the enterprise requirements.

12 Claims, 16 Drawing Sheets

(58) Field of Classification Search
USPC .................................................. 705/26, 27
See application file for complete search history.

(56) References Cited

U.S. PATENT DOCUMENTS

| | | | |
|---|---|---|---|
| 2002/0173971 A1* | 11/2002 | Stirpe | G06Q 30/02 |
| | | | 705/14.53 |
| 2010/0257131 A1* | 10/2010 | Kim | G06Q 30/02 |
| | | | 706/47 |
| 2013/0035962 A1 | 2/2013 | Zhang et al. | |
| 2014/0122228 A1 | 5/2014 | Wical | |
| 2015/0170040 A1* | 6/2015 | Berdugo | G06N 5/04 |
| | | | 706/11 |

OTHER PUBLICATIONS

Penchikala, Srini: "Big Data Processing with Apache Spark—Part 1: Introduction." infoq.com, Jan. 30, 2015, 22pgs. (Year: 2015).*

Paul, I. (Jan. 8, 2013). "Netflix adds personalized profiles with recommendations for your entire household," located at <http://www.techhive.com/article/2024221/netflix-adds-personalized-profiles-with-recommendations-for-your-entire-household.html> visited on Mar. 7, 2016. (5 pages).

Odden, L. (Jan. 26, 2014). "How SEO and Inbound Marketing Can Grow Your B2B Marketing Performance," located at <http://promotions-marketing.info/2014/06/26/how-seo-and-inbound-marketing-can-grow-your-b2b-marketing-performance/> visited on Mar. 7, 2014. (3 pages).

* cited by examiner

SYSTEM AND METHOD FOR PROVIDING CONTEXT DRIVEN HYPER-PERSONALIZED RECOMMENDATION

PRIORITY CLAIM

The present application claims priority to Indian Provisional Patent Application No. 943/MUM/2015, filed on Mar. 20, 2015, the entirety of which is hereby incorporated by reference.

TECHNICAL FIELD

The present subject matter described herein, in general, relates to a system and method for providing context driven hyper-personalized recommendation.

BACKGROUND

The rapid advancement in Digital Economy, along with the proliferation of smart phones and smart devices, has unleashed a magnitude of opportunities to the Enterprises by enhancing connectivity in the new age digitally empowered customers. The Enterprises are leveraging cutting edge digital technologies to drive customer engagement on a dynamic basis and perform pro-active performance management. For example, Autonomous Recommendation systems may be built to generate dynamic personalized products/services offerings to the customers, based on real-time information regarding the customer and his environment/surroundings. Such systems enable the Enterprise to automate the process of identifying the Customer's needs, interests and preferences based on his transaction history, thus improving the revenues and generating profits for the enterprise, while luring the customers to purchase products and services, personalized as per their specific requirements. Recommendation systems are broadly used both in e-commerce and offline retailing. Further, such Recommendation systems span across various sectors from retail to telecom to healthcare and others.

In the current technology landscape, some of the models frequently used in the Recommendation systems are Collaborative filtering approach, content-based filtering approach or a Hybrid approach comprising a combination of the two. In case of collaborative filtering, the recommendation may be generated based on the similarity measure of the consumers and/or products determined by users' rankings, likes/dislikes of products, etc. On the other hand, 'content based filtering' captures the attributes or feature sets of the products and maps it to the user preferences while generating recommendations.

However, as the Enterprises evolve, the Customer expectations have also shifted from 'how effectively your products and services meet my need' to 'sense my need before it is felt, engage before need manifests'. They prefer the Enterprises that serve to build an engaging experience rather than focusing purely on product features, performance and efficiency.

SUMMARY

Embodiments of the present disclosure present technological improvements as solutions to one or more of the above-mentioned technical problems recognized by the inventors in conventional systems. In view of the foregoing, embodiments herein provides a technique for context driven hyper-personalized recommendation.

In one embodiment, a system for generating a context-driven hyper-personalized recommendation is disclosed. The system comprises a processor and a memory coupled to the processor. The processor executes a plurality of modules stored in the memory coupled to the processor. The plurality of modules comprises a data ingestion module, an ontology builder module, a data processing module and a recommendation module. The data ingestion module may capture user-data, product-data and context-data dynamically. Further, the user-data and the context-data are captured based on at least one of past activities of a user, current activities of the user and a time of occurrence of an event. Further, the product-data is captured corresponding to a plurality of products to be recommended to the user. Further, the ontology builder module may generate user-data ontology, product-data ontology and context-data ontology based on the user-data, the product-data and the context-data respectively. The data processing module may prepare multi-dimensional user-matrix, product-matrix and context-matrix comprising user-vectors, product-vectors and context-vectors respectively, based on the user-data ontology, the product-data ontology and the context-data ontology respectively. Further, the data processing module may compare a user-vector and a product-vector in order to generate a first similarity score. The data processing module may further compare a product-vector and a context-vector in order to generate a second similarity score. Further, the data processing module may compute an overall score based on the first similarity score and the second similarity score. Further, the recommendation module may generate a recommendation set comprising one or more products, from the plurality of products, based on the overall score.

In another embodiment, a method for generating a context-driven hyper-personalized recommendation is disclosed. The method may comprise capturing, by a processor, user-data, product-data and context-data dynamically. Further, the user-data and the context-data are captured based on at least one of past activities of a user, current activities of the user and time of occurrence of an event. Further, the product-data is captured corresponding to a plurality of products to be recommended to the user. The method may further comprise a step of generating, by the processor, user-data ontology, product-data ontology and context-data ontology based on the user-data, the product-data and the context-data respectively. Further, the method may comprise a step of preparing, by the processor, multi-dimensional user-matrix, product-matrix and context-matrix comprising user-vectors, product-vectors and context-vectors respectively, based on the user-data ontology, the product-data ontology and the context-data ontology respectively. The method may further comprise a step of comparing, by the processor, a user-vector and a product-vector in order to generate a first similarity score. Also, the method may comprise the step of comparing, by the processor, a product-vector and a context-vector in order to generate a second similarity score. Further, the method may comprise a step of computing, by the processor, an overall score based on the first similarity score and the second similarity score. The method may further comprise a step of generating, by the processor, a recommendation set comprising one or more products, from the plurality of products, based on the overall score.

In yet another embodiment, a non-transitory computer readable medium embodying a program executable in a computing device for generating a context-driven hyper-personalized recommendation is disclosed. The program may comprise a program code for capturing user-data, product-data and context-data dynamically. Further, the user-data and the product-data are captured based on at least one of past activities of a user, current activities of the user and a time of occurrence of an event. Further, the program may comprise a program code for generating user-data ontology, product-data ontology and context-data ontology based on the user-data, the product-data and the context-data respectively. The program may further comprise a program code for preparing multi-dimensional user-matrix, product-matrix and context-matrix comprising user-vectors, product-vectors and context-vectors respectively, based on the user-data ontology, the product-data ontology and the context-data ontology respectively. Further, the program may comprise a program code for comparing a user-vector and a product-vector in order to generate a first similarity score. Also, the program comprises a program code for comparing a product-vector and a context-vector in order to generate a second similarity score. Further, the program comprises a program code for computing an overall score based on the first similarity score and the second similarity score. Further, the program comprises a program code for generating a recommendation set comprising one or more products, from the plurality of products, based on the overall score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
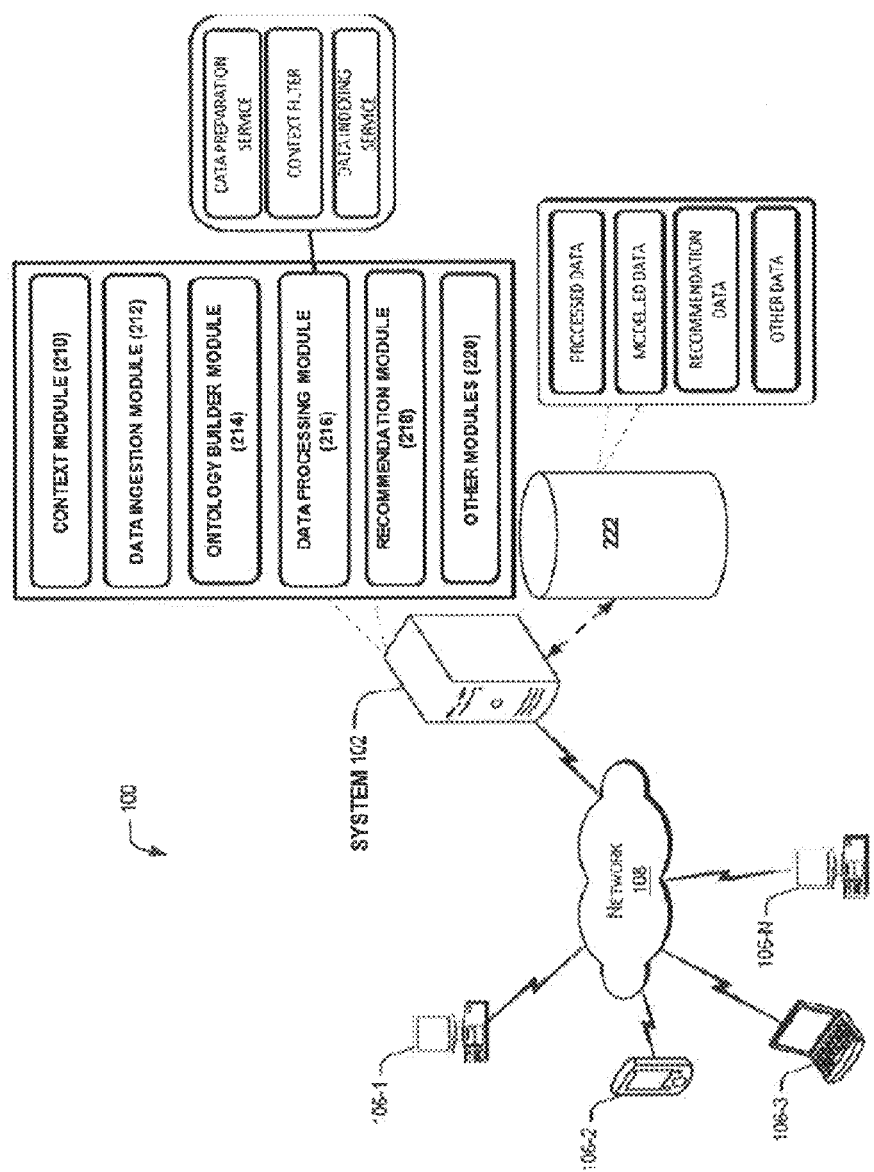
FIG. 1 illustrates a network implementation of a system for providing context-driven hyper-personalized recommendations, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure describes a context-driven hyper-personalized recommendation engine to drive personalization of customer engagement by recommending best fit product mix or offering from an enterprise product offerings space to customers, triggered by context in a dynamic environment based on the customer/user persona. In the present disclosure, the recommendation engine may be considered as a system capable of generating recommendations for the users associated with the system. Such recommendations may comprise offers on various products and/or services offered by at least the enterprises and its partners. It is to be appreciated here that the user and product/offer related data may evolve continuously and the recommendation engine is able to capture and reflect this dynamic behavior of the data sets, while generating recommendations. The recommendations may further be hyper-personalized from user-to-user to ensure that the users leverage the benefits of such offers.

According to aspects of present disclosure, user data, products/services offered by enterprises/service providers and its partner (a) and context data may be obtained from disparate data sources and stored to the data repository, which is further used while generating the recommendations.

According to embodiments of present disclosure, the user persona may refer to a particular facet of the customer/person defined by a predominant individual preference, likes and dislikes status, behavioral tendencies and associations. The User persona may be created from the user's current and historic data usage and other related data. It should be noted to person skilled in the art that the user persona may change with time and hence, the dynamicity of the user persona creation is incorporated with his/her current and historic data usage, preferences and the like. Thus, the user persona may enable the system to understand the role played by the customer in a specific environment (by capturing the dynamic nature of the User Persona) and accordingly provide hyper-personalized experience on-the-fly. Further, the User data may be stored in an ontological structure to incorporate a higher level of abstraction which may facilitate the system to generate recommendations not only at the granular level, but also at the parent level. For example, if the User is a facebook fan, he/she is also bound to be a social-media fan, which may be stored in the user-data Ontology. This information facilitates the system to generate recommendations not only related to Facebook data packs, but also to the Social media offers.

Further, the Recommendation Engine captures the Product data set to generate recommendations. Such a product offerings space may further be dynamic and evolutionary comprising the products offered by the Enterprise and its partners. New products/partner products/offers and/or new updates/versions of the existing products/partner products/offers are produced in a rapidly evolving Product portfolio space. For example, the offers in the Telecom sector have evolved from offers on calls and SMS to offers on internet usage and roaming and the like. Such an evolution is effectively captured in the system, as the Product data is stored in the data repository and may be updated from time to time.

Further, the system has a provision to capture the dynamicity in the environment, triggered by context in which the recommendation is to be provided to the user. In other words, the recommendation engine may be triggered by an event related to the user or activities performed by a user while generating product recommendations for the users. It is to be noted here that context is applied on a post-filtering basis, wherein the context may be applied to the recommendations generated on user-product mapping by content based filtering techniques.

According to embodiments of present disclosure, the context may be triggered by monitoring the events related to the user and different activities of the users. In one implementation, the context may be related to a "travel plan" of the user. Based on the travel plan, the system may capture the base location, source location, proximity location and the destination location as parameters to determine the context. Further, the base location may refer to the registered address of the user, source location may refer to the current location of the user, proximity location may refer to the locations in the vicinity of the user such as airport, railway stations, colleges, coffee outlets, business sites, shopping malls, gaming area, bike retailers, stadiums and the like. The destination location may refer to the end location of the user. Based on above details, the system generates the recommendations even before the user reaches the destination location, in order to leverage the benefits of the recommendation maximally.

According to other embodiments of present disclosure, the context may be based on the 'time of occurrence of an event' when the recommendation is being generated. For example, a user is browsing LinkedIn™ during morning hours, whereas YouTube™ during evening hours, then the system may provide the recommendation accordingly based on the time. Similarly, in case the user travels to work on weekdays and to beach on weekends, the system (recommendation engine) may predict the destination of travel based on the day of the week, and accordingly generate recommendations.

According to other embodiments of present disclosure, the context may be based on both the 'travel plan' and the 'time of occurrence of an event' while generating recommendations. In case the user is a football fan, and there is a live match scheduled during the time the user is travelling, an offer may be given on the 3G/4G data usage, in case the user's device is compatible with 3G/4G.

It may be noted to person skilled in art that the context capture based on 'travel plan' or 'time of occurrence of an event' or both, has been considered as an exemplary elucidation of the present subject matter throughout the detailed description, however, it does not restrict the scope of the present disclosure.

According to an embodiment of the present subject matter, weightage may be associated to each of the User Persona and context data, while generating recommendations, to ensure that the recommendations are relevant to both the context and hyper-personalization defining the user. Such a weightage may be generated on a dynamic basis by a training set. For example, if the user is in a Costa coffee outlet, but does not like coffee. Here, the User Persona (Coffee-averse) is given a higher weightage in comparison to Context (Costa-coffee outlet), due to which the recommendations may not include any offers on coffee. Such a User Persona may be derived from the past data usage and preferences of the user, which is stored in the data repository.

Referring to FIG. 1, a network implementation 100 of a system 102 for providing context-driven hyper-personalized recommendations is illustrated, in accordance with some embodiments of the present disclosure. In one embodiment, the system 102 may provide the hyper-personalized recommendations in such a manner that the recommendation is provided to the user/customer even before the need is felt by the customer so that he or she can leverage the benefits of the product or service offerings maximally. Although the present disclosure is explained considering that the system 102 is implemented as a software application on a server, it may be understood that the system 102 may also be implemented as a variety of computing systems, such as a laptop computer, a desktop computer, a notebook, a workstation, a mainframe computer, a server, a network server, a tablet, a mobile phone and the like. In one implementation, the system 102 may be implemented in a cloud-based environment. It will be understood that the system 102 may be accessed by multiple users through one or more user devices 106-1, 106-2 . . . 106-N, collectively referred to as user 106 hereinafter, or applications residing on the user devices 106. Examples of the user devices 106 may include, but are not limited to, a portable computer, a personal digital assistant, a handheld device and a workstation. The user devices 106 are communicatively coupled to the system 102 through a network 108.

In one implementation, the network 108 may be a wireless network, a wired network or a combination thereof. The network 108 can be implemented as one of the different types of networks, such as intranet, local area network (LAN), wide area network (WAN), the internet and the like. The network 108 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP) and the like, to communicate with one another. Further the network 108 may include a variety of network devices, including routers, bridges, servers, computing devices, storage devices and the like.

Figure 2:
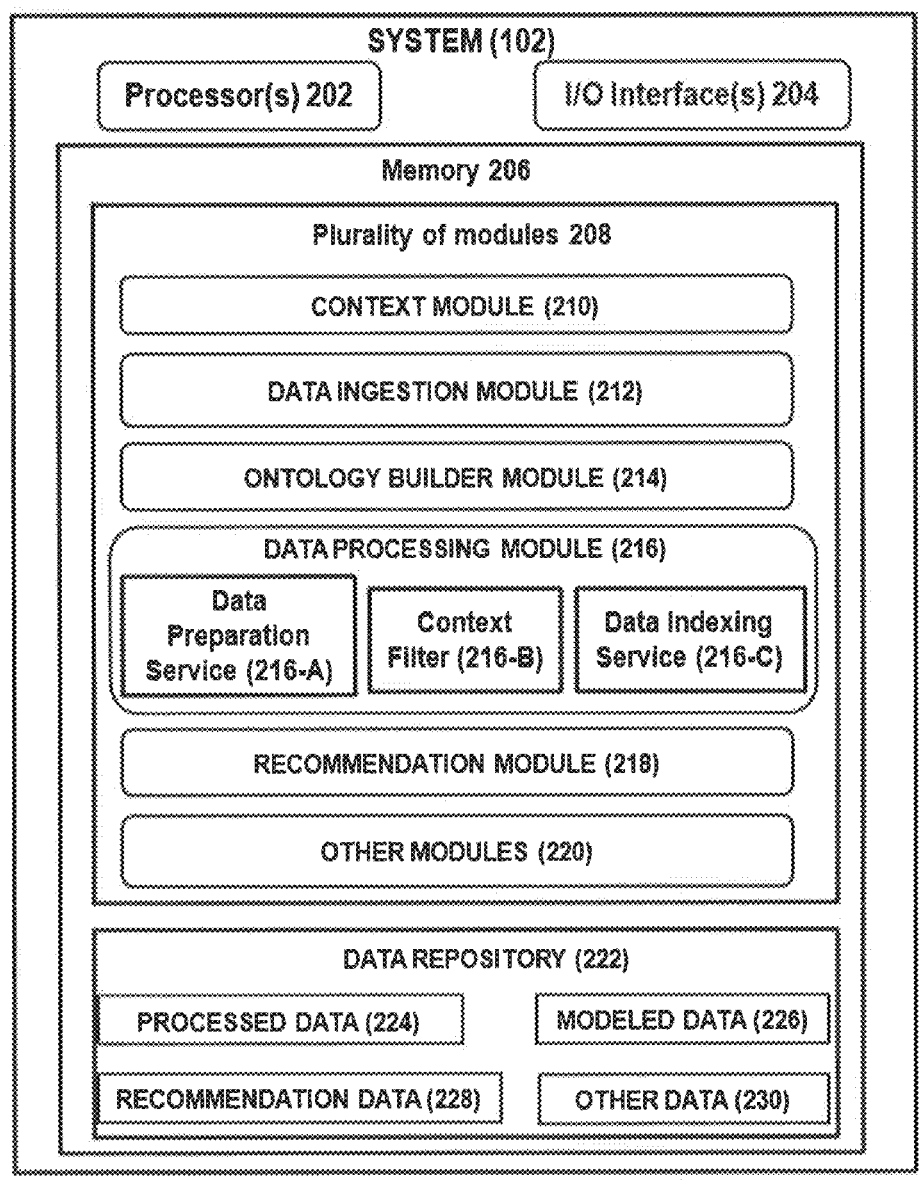
FIG. 2 illustrates the system, in accordance with some embodiments of the present disclosure.

Referring now to FIG. 2, the system 102 is illustrated in accordance with some embodiments of the present disclosure. In one embodiment, the system 102 may include at least one processor 202, an input/output (I/O) interface 204 and a memory 206. The at least one processor 202 may be implemented as one or more hardware processors, microprocessors, microcomputers, microcontrollers, digital signal processors, central processing units, state machines, logic circuitries and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface and the like. The I/O interface 204 may allow the system 102 to interact with a user. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc, and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks and magnetic tapes. The memory 206 may include plurality of modules 208 and data repository 222.

The plurality of modules 208 include routines, programs, objects, components, data structures, etc., which perform particular tasks or implement particular abstract data types. In one implementation, the plurality of modules may include a context module 210, a data ingestion module 212, an ontology builder module 214, a data processing module 216, a recommendation module 218 and other modules 220. The other modules 220 may include programs or coded instructions that supplement applications and functions of the system 102. Also, the data processing module 216 may further comprise data preparation service 216-A, context filter 216-B and data indexing service 216-C. Each of the modules is explained in detail in subsequent paragraphs of the description.

The data repository 222, amongst other things, serves as a repository for storing data processed, received and generated by one or more of the plurality of modules 208. The data repository 222 may also include processed data 224, modeled data 226, recommendation data 228 and other data 230. The detailed description of the modules 208 along with other components of the system 102 is further explained referring to FIGS. 3 and 4.

Figure 3:
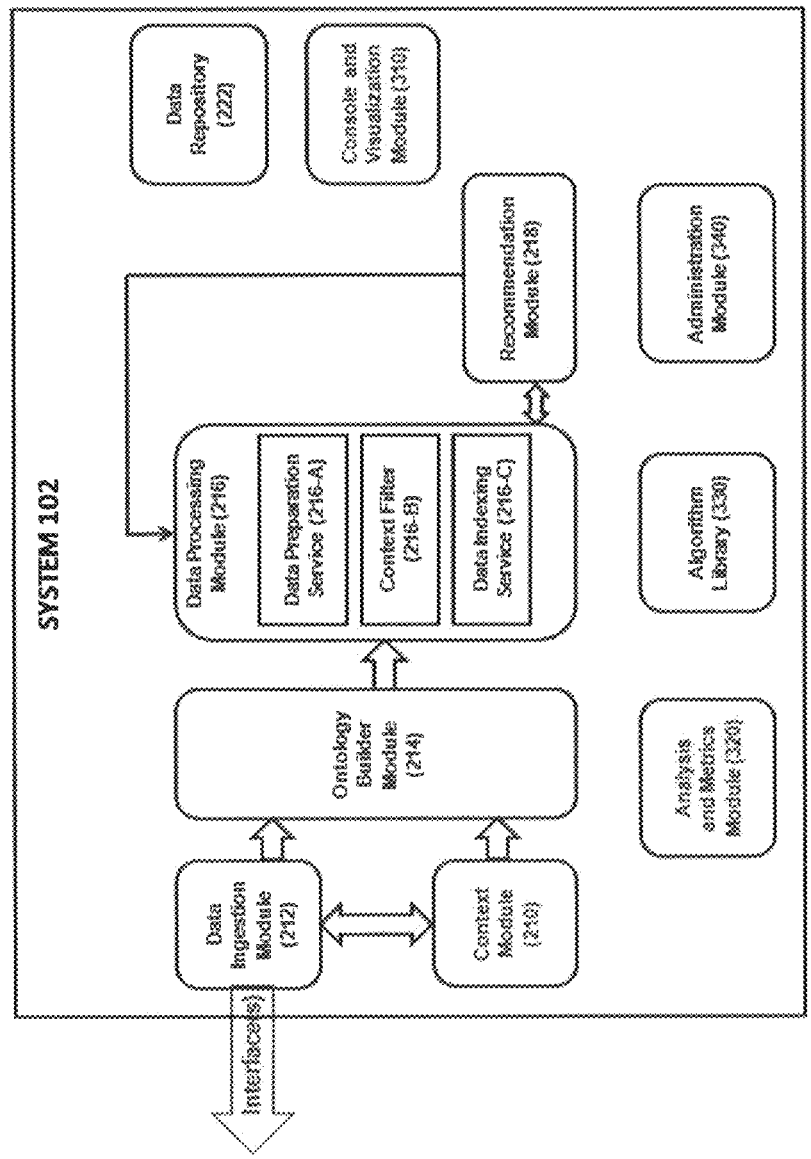
FIG. 3 illustrates process flow diagram for deriving context-driven recommendations corresponding to a particular user, in accordance with some embodiments of the present disclosure.

As illustrated in FIG. 3, the context module 210 of the system 102 may capture context on a dynamic basis. The context module 210 may be triggered by the occurrence of a particular event or particular activities performed by a user. Such an event and/or activities may be determined by a pre-defined rule set, or a training set. For example, in case the user is travelling, and if there is a shopping mall within a 100 km radius of the user, the context module 210 may trigger the travel context emphasizing that any recommendations pertaining to that particular event may be sent to the user, even before he or she reaches the destination. Similarly, in case the data usage reaches a certain threshold, as determined by the pre-configured training set, certain recommendations may be offered to the users. Such a context-capture mechanism may further be implemented on a real-time basis, as the recommendations need to be pushed to the user when he or she can leverage the benefits of the offer maximally.

Figure 4:
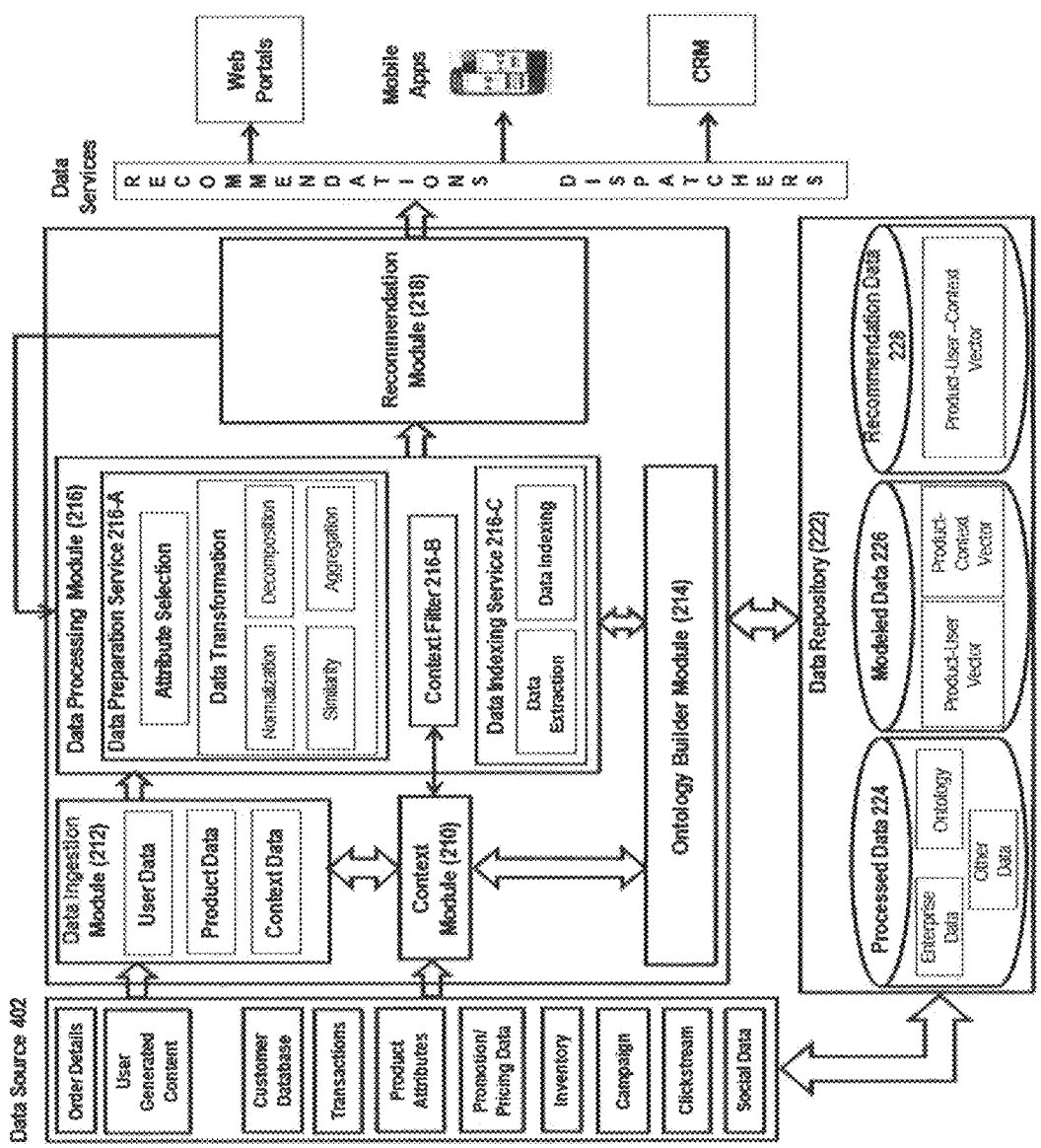
FIG. 4 illustrates functional architecture of the implementation of the context-driven hyper-personalized recommendation, in accordance with some embodiments of the present disclosure.

Further, the data ingestion module 212, of the system 102, may ingest data obtained from disparate data sources with different volumes, velocity and variety (in near-real time/ batch). The disparate data sources may be data sources 402 as shown in FIG. 4 including, but not limited to enterprise data, social data, and other data. As shown in the FIG. 4, the different data sources 402 may comprise "order details", "user generated content", "customer database", "transactions", "and product attributes", "promotion/pricing data", "inventory", "campaign", "clickstream" and "social data". Further, the data sources 402 may comprise data regarding the users (i.e., user data), context (i.e., context data) and the enterprise product (i.e., product data) offerings based on which the recommendation is to be generated. There may different types of data collected from these sources, for example, user data, context data and product data. Each of these data is explained in detail in subsequent paragraphs of the present disclosure.

Figure 5:
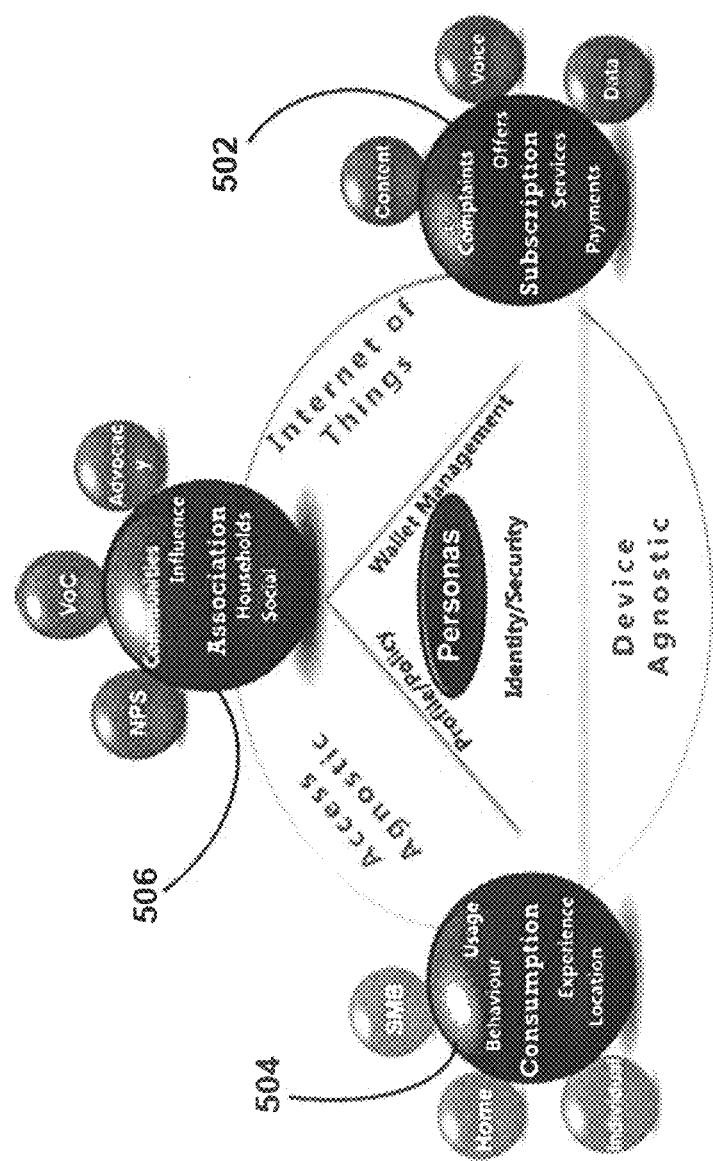
FIG. 5 illustrates an exemplary model for user persona creation, in accordance with some embodiments of the present disclosure.

According to embodiments of present disclosure, the user-data and the context-data are captured, by the data ingestion module 212, based on past activities of the user, current activities of the user and time of occurrence of an event. The past activities may be that the user has a history of using voice data very heavily for last 2 years. However, in last few weeks, it was observed that the user is now spending more time on social media. Thus, the usage of social media shows the user's current activities, whereas, the usage of the voice data indicates the past activities of the user. All these activities of the user may be captured from the data sources 402 as shown in the FIG. 4. The users are also considered as customers of an enterprise. The users plays multiple roles including, but not limited to, an individual, as part of community, a household and a sports fan, social media fan, music fan and the like depending on the location, time and associations. It is critical for the enterprises to understand these personas and stitch together personalized experiences for the digital customer depending on the specific role. The data ingestion module 212 may capture the user data to interpret the customer/user behavior pattern and may comprise information regarding the customers/users of at least the enterprise, and its partner(s). Further, the information may include personal details of the user and processed data 224. The processed data 224 (as shown in FIG. 4) may be obtained from the enterprise relevant to the user. The enterprise further comprises various dimensions in which the processed data 224 is obtained. The various dimensions comprise association data/pattern, subscription data and consumption data (e.g. as shown in FIG. 5) which are related to the users of the Enterprise. In one example, the user data in telecom sector may include the personal details of the user such as name, date-of-birth, home region, data obtained from social networking sites and the like. In another example, the processed data 224, obtained from the user data, may comprise customer type (high/medium/low value) obtained from the average bill amount, streaming media preference, streaming media data usage, social media data usage and the like. The continuous data may further be averaged out (on per day/per month basis) for better comparison and mapping with product data which has been described later in subsequent paragraphs of the description. The processed data 224 is further stored in the data repository 222 of the system 102. Further, the user data along with the processed data 224 is used for generating user persona as explained in subsequent paragraphs of the description.

Apart from the user-data, the data ingestion module 212 also captures the context-data. The context-data is also captured based on the past and the current activities of the user. According to embodiments of present disclosure, the context-data may be further based on the 'travel plan' and/or 'time of occurrence of an event' of the user while generating recommendations. The context-data may be represented as a context vector comprising attributes such as purpose of travel, length of journey, time of travel, location, type of travel and the like. The purpose of travel may be a business trip, personal trip or a pleasure trip with either family/friends or alone. The length of the journey may refer to the distance (in km). The time of travel may refer to the duration as well as the time of day when the travel takes place i.e., weekend/weekday or morning/noon/evening etc. The location attribute may comprise information about the base location, source location, proximity location and destination location as discussed above. The type of travel may be domestic tour or international tour. Further, the data ingestion module 212 also captures the product-data corresponding to plurality of products to be recommended to the user.

Figure 7:
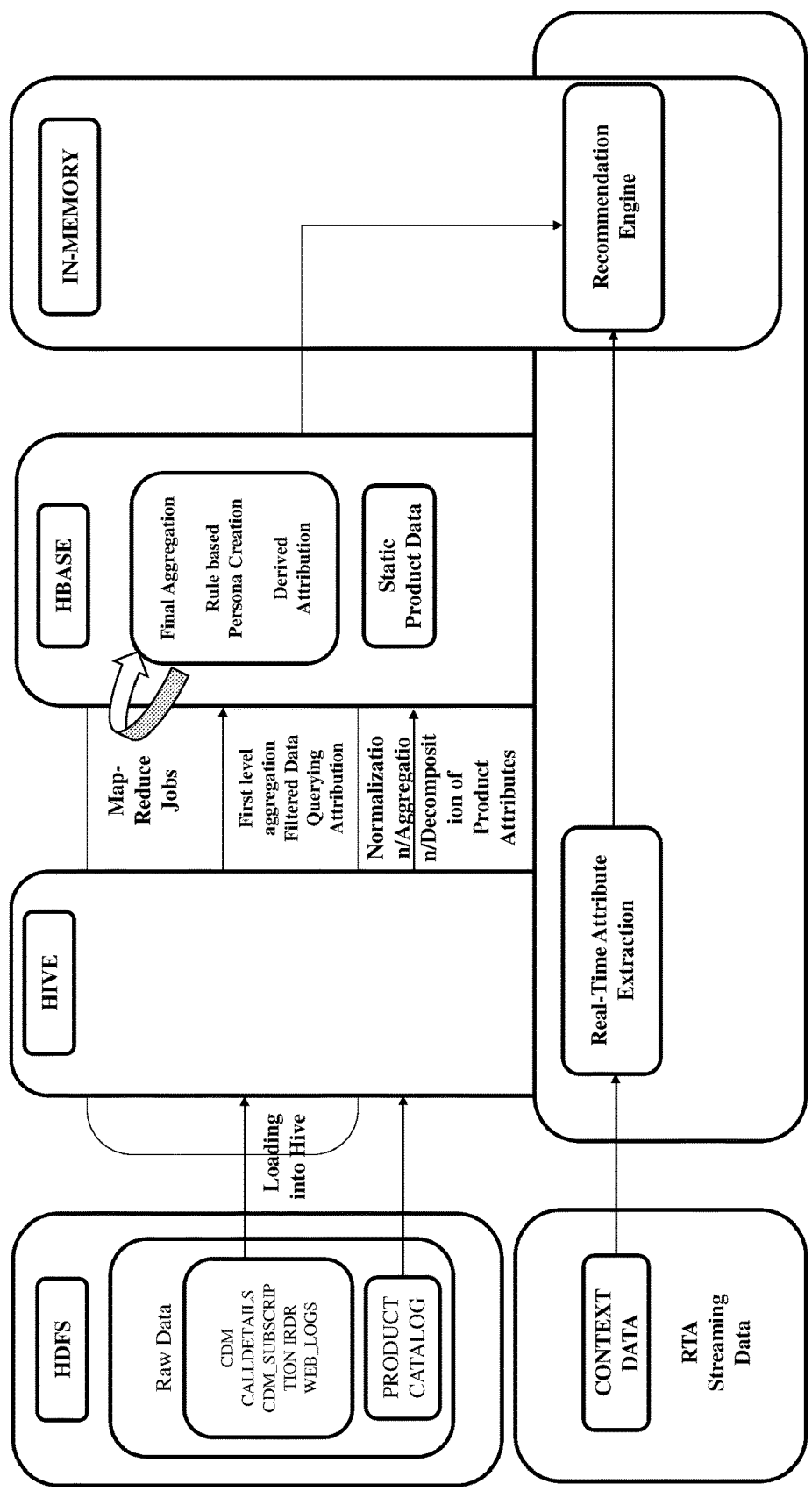
FIG. 7 illustrates the data integration workflow, in accordance with some embodiments of the present disclosure.

The data obtained (i.e., the user-data, product-data, context-data) from the data ingestion module 212 is in a crude format, and may not be compatible for data processing. In one implementation, the raw data pertaining to the users/product/context may be stored in a storage space for large data sets, for example, HDFS 702 (Hadoop distributed File system) as shown in FIG. 7. The raw customer/user data obtained from the CDM/CDR/IPDR/Weblogs and the product data (represented as product catalogue within the Enterprise) may be loaded to Hive 704 (Data warehouse infrastructure built over Hadoop for providing query and analysis of data sets), and then dumped into the columnar table, for example, HBase 706. Further, the context data may directly be used while generating recommendations from the in-memory 708 cache. Such data may further be stored in the data repository 222 for analytics and future recommendations.

Thus, the data (the user-data, product-data, context-data) is further stored in the data repository 222 based on a pre-defined ontology for efficient information retrieval mechanism. According to embodiments of present disclosure, the ontology builder module 214, of the system 102 may represent the data in a columnar database, for example, HBase, and build the ontology for each of the user-data, the product-data and context-data obtained from the data ingestion module 212. Basically, an ontological model is built corresponding to each domain data (i.e., the user-data, product-data and context-data) in such a manner that the ontological model explains each domain data in detail. In one example, the domain data may be extracted from a natural language text and stored in the form of ontological model in the data repository 222. Thus, user-data ontology, context-data ontology and product-data ontology is generated by the ontology builder module 214. Apart from aforementioned ontology, the ontology builder module 214 also generates user-persona ontology based on user-persona which is generated by the ontology builder module 214. The generation of the user-persona is explained in subsequent paragraphs of the description. Further, the product-data ontology, the context-data ontology, the user-data ontology and the user-persona ontology is shown in FIGS. 6a, 6b, 6c and 6d respectively.

Figure 6A:
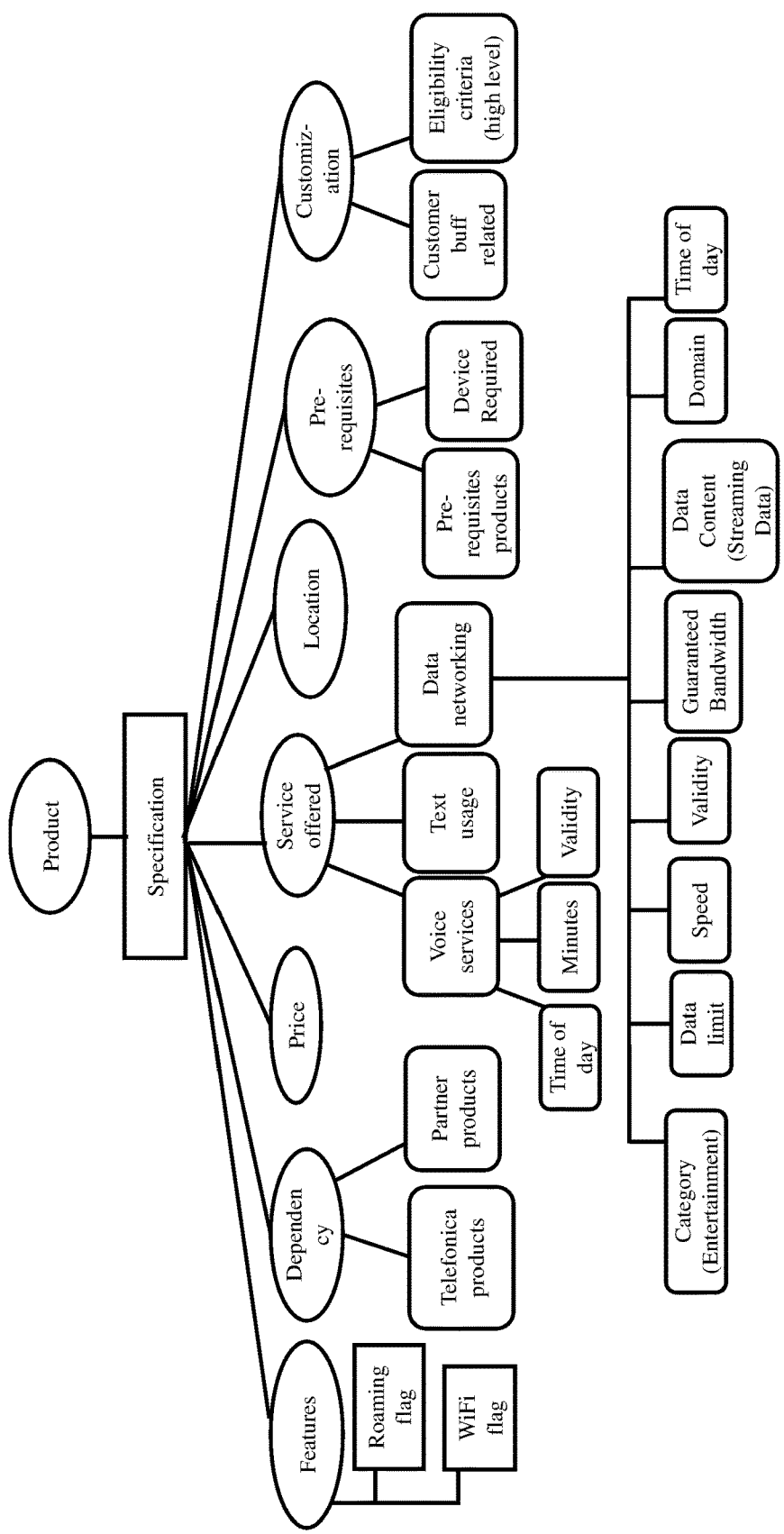
FIGS. 6a, 6b, 6c and 6d illustrate product ontology, context ontology, user ontology and user persona ontology respectively, for an enterprise in a telecom sector, in accordance with some embodiments of the present disclosure.
Figure 6B:
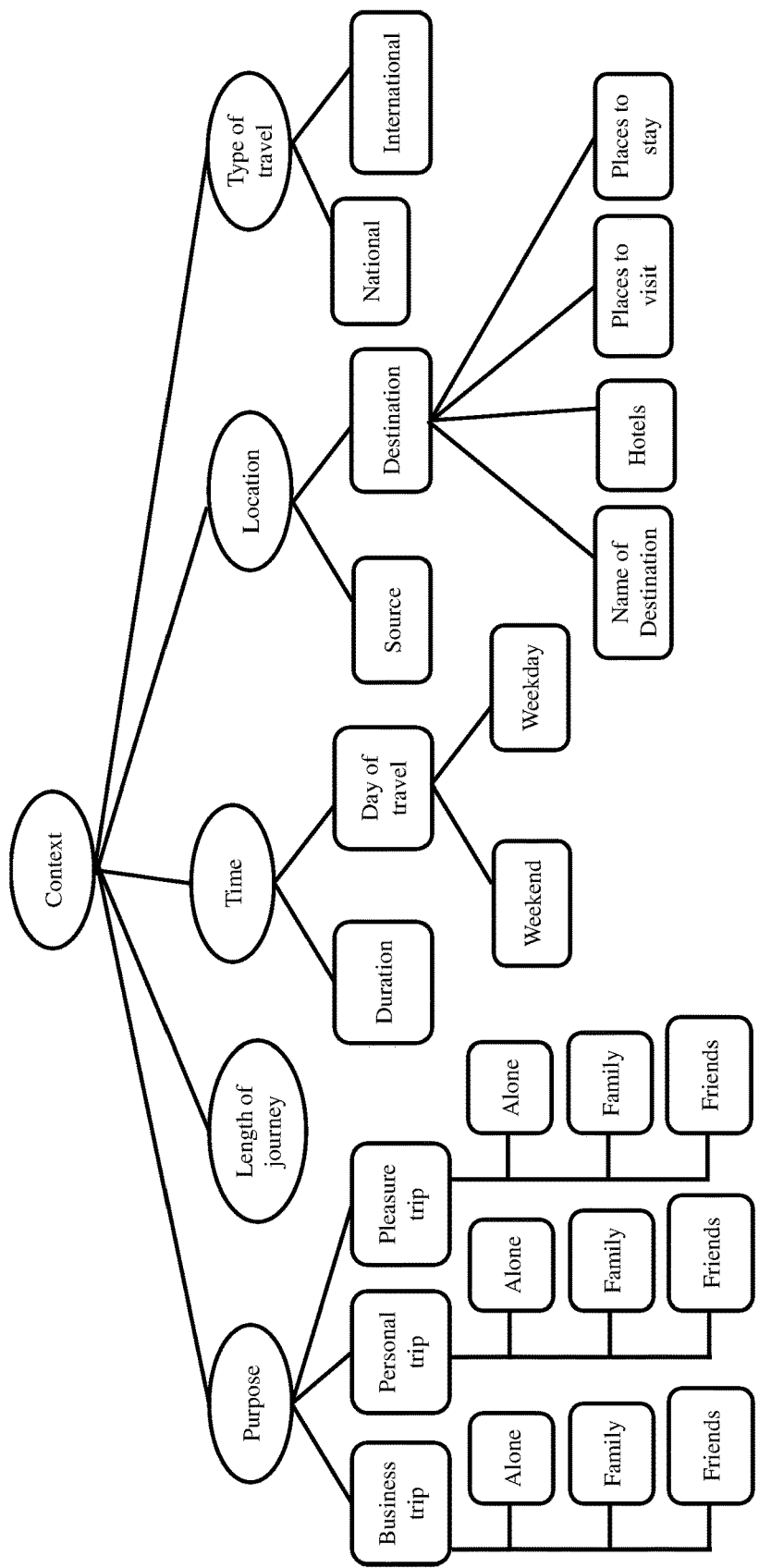
Figure 6C:
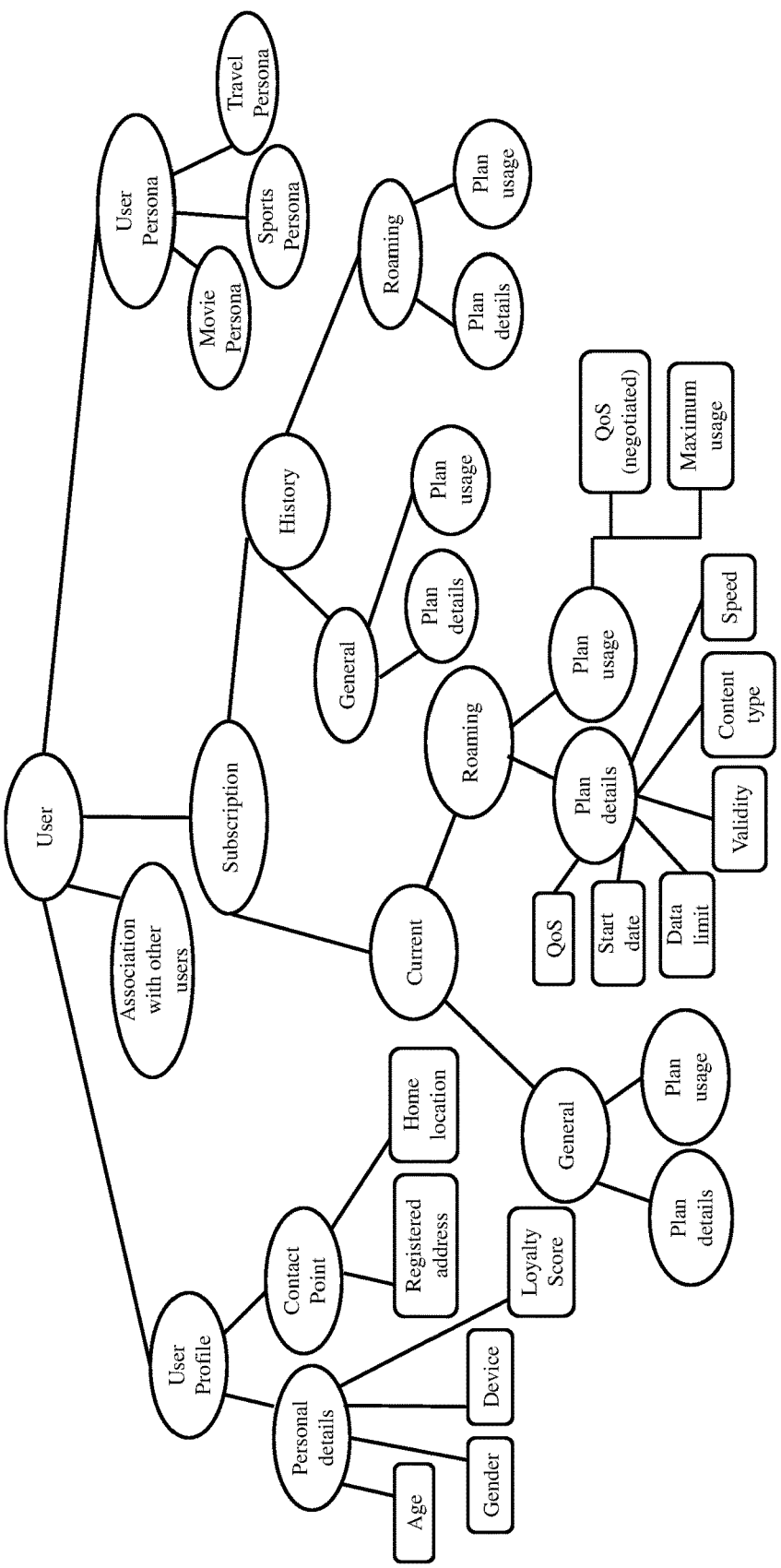
Figure 6D:
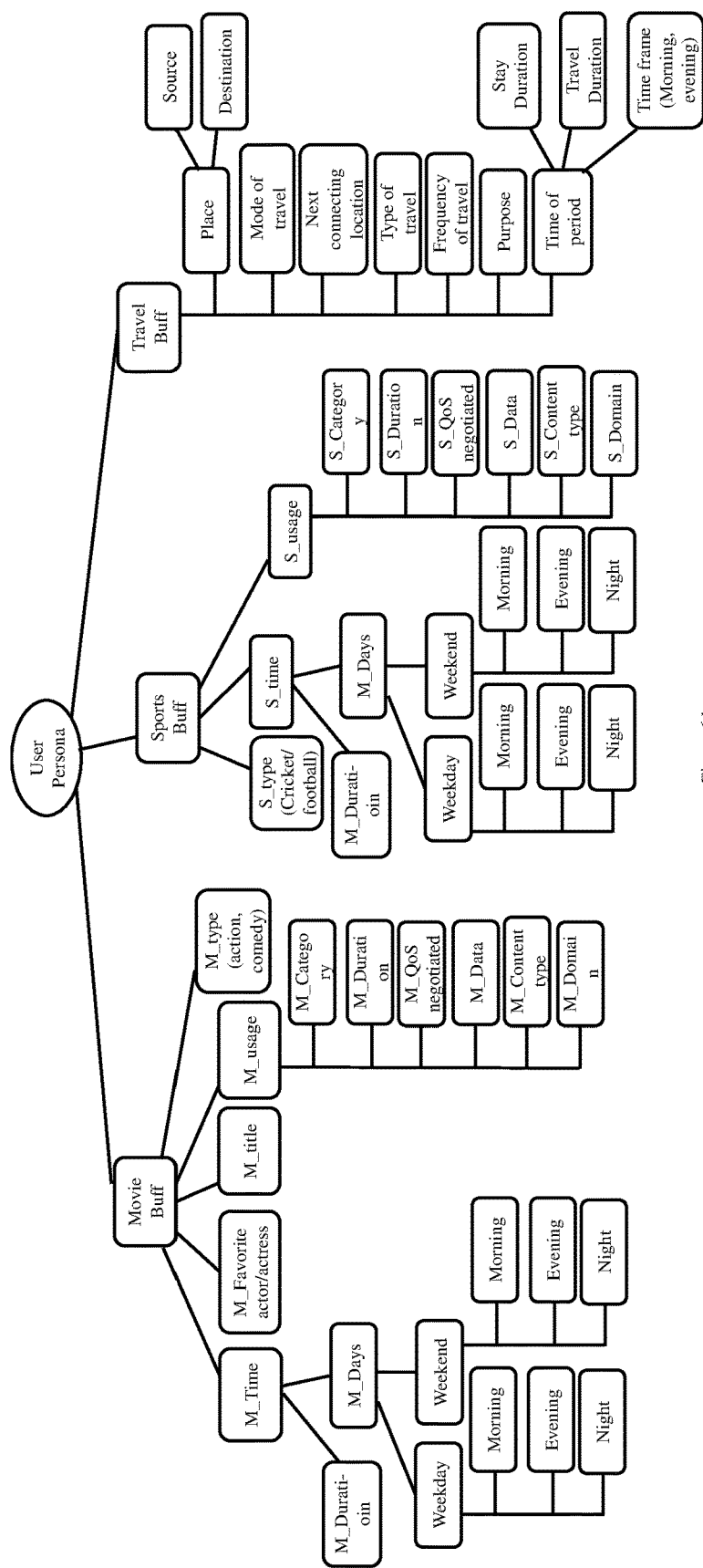

It is to be noted that the representation of the data as shown in the FIGS. 6a, 6b, 6c and 6d, is merely an exemplary elucidation of the present subject matter, and do not restrict the scope of the present disclosure. The FIG. 6a shows the product-data ontology. In this example, the specifications, of the product, such as features, dependency, price, service offered, location, pre-requisites and customization is shown. Further, "roaming flag" and "WiFi flag" are the two features which are shown under the "features" in the product-data ontology diagram. Similarly, "voice services", "text usage" and "data networking" are shown under the "services offered" in the product-data ontology diagram. Further, the FIG. 6b shows the context-data ontology. Under this ontology, the context like "purpose", "length of journey", "time", "location" and "type of travel" is shown. Further, the context "purpose", is further divided into three contexts such as "business trip", "personal trip" and "pleasure trip". The context "business trip" further contains "alone", "family" and "friends" in the context-data ontology diagram. Further, the FIG. 6c shows the user-data ontology. Under this ontology, "user profile", "association with other users", "subscription" and "user persona" is shown at a first hierarchal level. The "user profile" further has two categories i.e., "personal details" and "contact point". Similarly, the FIG. 6d shows the user-persona ontology. Under this ontology, the user personas like "movie buff", "sports buff" and "travel buff" are shown.

Further, the ontological representation enables the system 102 to capture the context appropriately, as the definition and usage of context is contextual in nature and varies from sector to sector/enterprise to enterprise. Further, the ontological representation of user-data may enable the system 102 to identify the user's interests and preferences appropriately. For example, a football fan may also be a sports fan, and belongs to the sports persona that can be identified from the ontological structure of data representation. Such a level of abstraction enables the system 102 to provide recommendations, not only at the granular level, but also at the parent level. For example, in case the user likes to watch action movies, however, there are no recommendations related to action movies, the system 102 may generate offers related to movies in general, as an action movie fan would belong to the movie persona. Further, each of the ontology discussed above i.e., the product-data ontology, the context-data ontology and the user-data ontology comprises product-attributes, context-attributes and user-attributes respectively. The attributes present in the ontology are used for generating matrices.

In the next step, the data processing module 216 prepares multi-dimensional matrices, such as, user-matrix, the product-matrix and the context-matrix based on the user-data ontology, the product-data ontology and the context-data ontology respectively. For generating the matrices, in a first step, the data processing module 216 selects the user-attributes, the product-attributes and the context-attributes corresponding to the user-data ontology, the product-data ontology and the context-data ontology respectively. Then, the selected user-attributes, product-attributes and the context-attributes are normalized by the data processing module 216. After the normalization, the data processing module 216 decomposes the user-attributes, the product-attributes and the context-attributes into Boolean and continuous values in order to generate the user-matrix, the product-matrix and the context-matrix respectively. Each of these steps in explained below in detail by referring FIG. 11.

Further, the generation of the user-matrix is explained in detail in subsequent paragraphs of the description. However, before understanding the generation of the user-matrix, the generation of the user persona is explained in detail by referring FIG. 5. According to embodiments of present disclosure, the ontology builder module 214 generates the user persona by using the user details i.e., the user-data and the processed data 224 (as shown in FIG. 4), based on a pre-configured rule set, which may facilitate in generating hyper-personalized recommendations for the users. The user persona is a particular facet of a customer/person defined by at least the individual preferences i.e., likes and dislikes behavioral tendencies and associations. In one implementation, the attributes taken into consideration while creating the user persona may be based on the model as shown in the FIG. 5. The user persona may be based on the personal details of the user and the processed data 224 obtained from the enterprise comprising various dimensions (as discussed above) such as subscription data 502, consumption data 504 and association pattern/data 506 of the user, as shown in the FIG. 5. The subscription data 502 may refer to the data collected from customer's interaction with other internal systems i.e., the payments, services, offers and complaints by the user. The subscription data 502 may include customer's subscription details, offer acceptance, bill payment schedules and the like. From the aforementioned data sources, the system 102 may derive different types of patterns. For example, a pattern may be derived which indicates customers alignment to the various types of products available. Another pattern may be derived that indicates the customer raising a complaint. Yet another pattern may be derived which shows possibility of a customer defaulting on bill payments. Further, the consumption data 504 refer to the data collected from various services consumed i.e., the usage of the subscriptions, customer experiences and the location of consumption, based on which the customer behavior may be analyzed. Further, the consumption data 504 may further include consumption details like total voice call duration, total data usage, average quality of service delivered and the like. From customer's consumption pattern, the system 102 may derive the behavioral pattern that exist when the customer is at home or office (Small and Medium Business). Further, the association pattern/data 506 may refer to the data collected from external systems i.e., the connectedness between various customers within and across various enterprises, and otherwise, that influences the customer behavior pattern. The system 102 may analyze social media profile like Facebook™ and Twitter™ of a user to understand his/her level of influence in the society, household structure and association with other customers. Based on above analysis, the system 102 may derive different metrics like voice of customer (VOC) and net promoter scores (NPS). Further, device agnostic and access agnostic i.e., context and persona capture techniques spanning across different devices like desktops, tablet, mobile and IoT enabled devices.

The person skilled in the art may appreciate that the persona creation, enrichment and enlargement is dynamic, based on the association and consumption attributes pertaining to the user. As discussed above by referring FIG. 6d, the user personas may include, but not limited to, movie persona, sports persona, travel persona, or social media persona. The movie persona indicates that the user may be an ardent follower of movies, sports persona indicates that the user may be a sports fan, a travel persona indicates that the user may be a frequent traveler, and a social media persona indicates that the user may be an ardent user of facebook, twitter and other social networking sites. For example, the user with YouTube™ duration more than 600 hrs/month and volume >10 GB may be categorized as a "you tube persona" and in general a "movie persona" and/or "streaming persona".

Now considering a sample use-case in the telecom sector, generation of the user-matrix is explained in detail. In the aforementioned user-case (i.e., telecom sector), some of the sample fields in the user-matrix for a user XYZ that may be generated and further leveraged to create/identify the user persona are shown in below table.

TABLE 1

| Sample fields in the User Matrix in the Data Repository of an Enterprise | |
|---|---|
| Category | RESIDENTIAL |
| Customerstatus | ACTIVE |

TABLE 1-continued

| Sample fields in the User Matrix in the Data Repository of an Enterprise | |
|---|---|
| Device type | 3G |
| Dob | dd-mm-yyyy |
| Gender | MALE |
| Home region | India |
| Name | XYZ |
| cricket fan | 0 |
| facebook fan | 100 |
| football fan | 0 |
| gaming fan | 60 |
| netflix fan | 40 |
| social media fan | 80 |
| sports fan | 0 |
| streaming fan | 20 |
| twitter fan | 0 |
| uncategorized fan | 0 |
| youtube fan | 0 |
| Totalsessions | 200 |

However, it may be noted that, the above table 1 is just an example, and the persons skilled in the art may appreciate that all the users associated with the system 102 may exhibit different personas at different stages. Further, the user may exhibit multiple personas at the same time, i.e. a user may be a sports fan and a social media fan at the same time. This dynamic persona creation and updation may enable the system 102 to generate hyper-personalized recommendations even before the need relevant to the context is realized by the user. In the above example, the user XYZ is a Facebook™ fan, social media fan, gaming fan, Netflix™ fan and a streaming fan in that order. In this case, higher weightage will be given to products/offers associated with Facebook™ and Social media, in comparison to others.

It is to be noted here that the user persona may be ranked based on both the Individuals interests and preferences (more emphasis on user's affinity to certain products), or the individual's interests and preferences relative to the population's consumption data. Herein, the population refers to the entire enterprise customer (user) database.

For example, consider a User A whose data consumption for the past month has been as follows:

a) Cricket data usage—5 GB b) Facebook™ data usage—10 GB c) Chess data usage—3 GB In the same duration, the overall Population Average data consumption has been as follows:

a) Cricket data usage—2.5 GB b) Facebook™ data usage—2.5 GB c) Chess data usage—0.5 GB In this case, based on Individual's interests, the user personas may be ranked as Facebook™, Cricket and Chess Personas (in decreasing order of affinity), whereas based on the individual's interests relative to the population, the User persona may be ranked as Chess, Facebook™ and Cricket Personas (in decreasing order).

This ensures that the system 102 captures the user's specific interests that may/may not get highlighted when analyzing individual consumption data, but identified when the user is compared with the population.

Further, in case the user persona does not exist in the data repository 222, a new user persona may be generated on a dynamic basis, and can be updated on the fly. For example, if the user is a glib talker (heavy call usage), and there may not be a persona "Frequent caller persona" in the data repository, such a persona may be added to the existing data repository 222 based on the enterprise's requirements.

Further, the next matrix is the product-matrix explained below in detail. As explained in the above section of the description, the matrices are prepared by using attributes associated with their ontology. Therefore, for generating the product-matrix, the attributes related to the product may be used. The product-matrix generated may comprise product vectors representing product information with certain pre-defined product attributes, which may be relevant for generating recommendations. For example, in case of telecom sector, the product-matrix may comprise various fields such as package id, package name, product name, target segment, data usage and the like. In one implementation, the recommendations may be generated for partner products, the product-data may further comprise information regarding similar attributes of the partner products or the plurality of products which may be recommended to the user. The table 2 below highlights an exemplary elucidation of various products attributes considered for generation of the product matrix for the telecom sector, in accordance with the subject matter of the invention.

TABLE 2

Product attributes considered for generating Product Matrix for the Telecom sector

| Field Name | Data Type | Size | Value | Index | Constraints | Comments |
| --- | --- | --- | --- | --- | --- | --- |
| Package Id | | | | | | |
| Package Name | | | | | | |
| Product Name | | | | | | |
| Description | | | | | | |
| Target Segment | | | | | | |
| Data 3G/4G | | | | | | |
| Time of Day | | | | | | |
| Guaranteed Bandwidth (GBW) | | | | | | |
| Applicable country | | | | | | |
| Roaming Flag | | | | | | |
| Validity (day(s)) | | | | | | |
| Customer Value (Low/Medium/High) | | | | | | |
| Proximity location | | | | | | |
| Pre-requisites | | | | | | |
| Price | | | | | | |
| Dependency | | | | | | |
| Services offered | | | | | | |

After generating the product-matrix, the data processing module 216 may further generate the context-matrix. As explained in the above section of the description, the context-matrix may comprise attributes Purpose of travel, Length of journey, Time of travel, Location, Type of Travel and the like. The Purpose of travel may be a business trip, personal trip or a pleasure trip with either family/friends or alone. The length of the journey may refer to the distance (in km). The Time of travel may refer to the duration as well as the time of day when the travel takes place i.e., weekend/weekday or morning/noon/evening etc. The Location attribute may comprise information about the base location, source location, proximity location and destination location as discussed above. The type of travel may be Domestic tour or International tour.

It is to be appreciated here that these attributes (of the Context-matrix) may be mapped to certain attributes in the product-matrix (Table 2) in order to generate context-based recommendations. For example, the Roaming flag attribute in the product-matrix may be 1 for International tour and 0 for Domestic tour. In case the product suits an International tour (denoted by roaming flag=1), for example, the user is travelling from Tokyo to Paris by afternoon flight, the user may receive a roaming offer with heavy data bandwidth that incentivizes Netflix™ and other video streaming sites, assuming the user is a Netflix™ fan. Thus, the system 102 generates hyper-personalized recommendations based on the context by assigning a higher weightage to context in comparison to the user preferences. Such a weightage may further be calculated on a dynamic basis, based on enterprise's requirements.

Similarly, the probable proximity locations may be stored in the product-matrix to identify the recommendations based on such proximity, as the recommendations on products are generally based on context of their use. For example, a merchandise offer on Manchester United would be preferred by a user who is in proximity to a football stadium. Similarly, a free partner WiFi and data access on international roaming offer may be given to a customer on the international roaming plan in case the user is nearby an airport or railway station. Such a proximity capture enables the system 102 to generate personalized recommendations to the users based on the location of the user. According to embodiments of present disclosure, these parameters may be determined by probabilistic approach wherein the various attributes relevant to Context may be determined based on historic and current data pertaining to a particular user.

Further, it may be noted to a person skilled in art, that all the attributes shown in the above tables 1 and 2 may not be considered relevant for generating the recommendations for some users. In such cases, only the relevant attributes needs to be processed for faster and efficient recommendation generation. In this view, the above described ontology is flattened and only a few relevant attributes are considered for further processing. Such customization of the attributes is done dynamically by the system 102 on a case-to-case basis with the help of attribute selection as shown in the data processing service 216-A of the data processing module 216 as shown in FIG. 4.

As discussed in the above section of the description, the data obtained from the data ingestion module 212 may be processed by the data processing module 216 on a batch-to-batch basis, or based on request from the user. As shown in FIG. 4, the data processing module 216 may comprise various services as shown in below table. Each of these services (data preparation service 216-A, context filter 216-B and data indexing service 216-C) is explained in detail in subsequent paragraphs of the description.

| 1) Data Preparation service<br>   a. Attribute Selection<br>   b. Data Transformation<br>      i. Normalization<br>      ii. Decomposition<br>      iii. Similarity<br>      iv. Aggregation | 2) Context Filter | 3) Data Indexing Service<br>   a. Data Extraction<br>   b. Data indexing |
|---|---|---|

Data Preparation Service (216-A): As mentioned in the ontology builder module 214, the product-attribute set may be obtained by mapping the list of products with their corresponding attributes to build the product-data ontology. However, not all the attributes pertaining to a particular product are relevant while generating the recommendations. The system 102 may segregate the relevant attributes from the ontology, thus flattening the ontology and enhancing the performance of the system 102. As shown in the above table 2, the product-matrix may comprise attributes such as Package Id, Package Name, Product Name, Description, Target Segment, Data 3G/4G, Time of Day, Guaranteed Bandwidth (GBW), Applicable country, Roaming Flag, Validity (day(s)), Customer Value (Low/Medium/High), Proximity location, Pre-requisites, Price, Dependency and Services offered. However, for generating recommendations, according to an example, only the following attributes may be relevant i.e., Package Id, Target Segment, Data 3G/4G, Time of day, Roaming Flag and Proximity location. Only these attributes will be dynamically mapped to the corresponding user attributes and context attributes. For example, Data 3G/4G attribute in the product-matrix (table 2) may be mapped to Device type attribute in the user-matrix (Table 1).

It is to be noted here that, a single product attribute may be mapped to a set of user preferences, similarly, a single user preference may be mapped to a set of product attributes. Such a mapping may be achieved dynamically based on a pre-configured rule set. Thus the system 102 generates a product-user scalar (P*U) by taking the scalar dot product of the two vectors i.e., product vector $P_{n*m}$ and user vector $U_{q*m}$.

In one implementation, such a persona creation may further involve data transformation comprising scaling/normalization of the vectors, decomposition of the vectors in boolean and continuous attributes, identifying the similarity between the vectors by comparing the respective attributes by content-based filtering approach and aggregating the data to form a scalar, for example, product-user scalar (P*$U_{n*q}$) as discussed above.

Figure 10A:
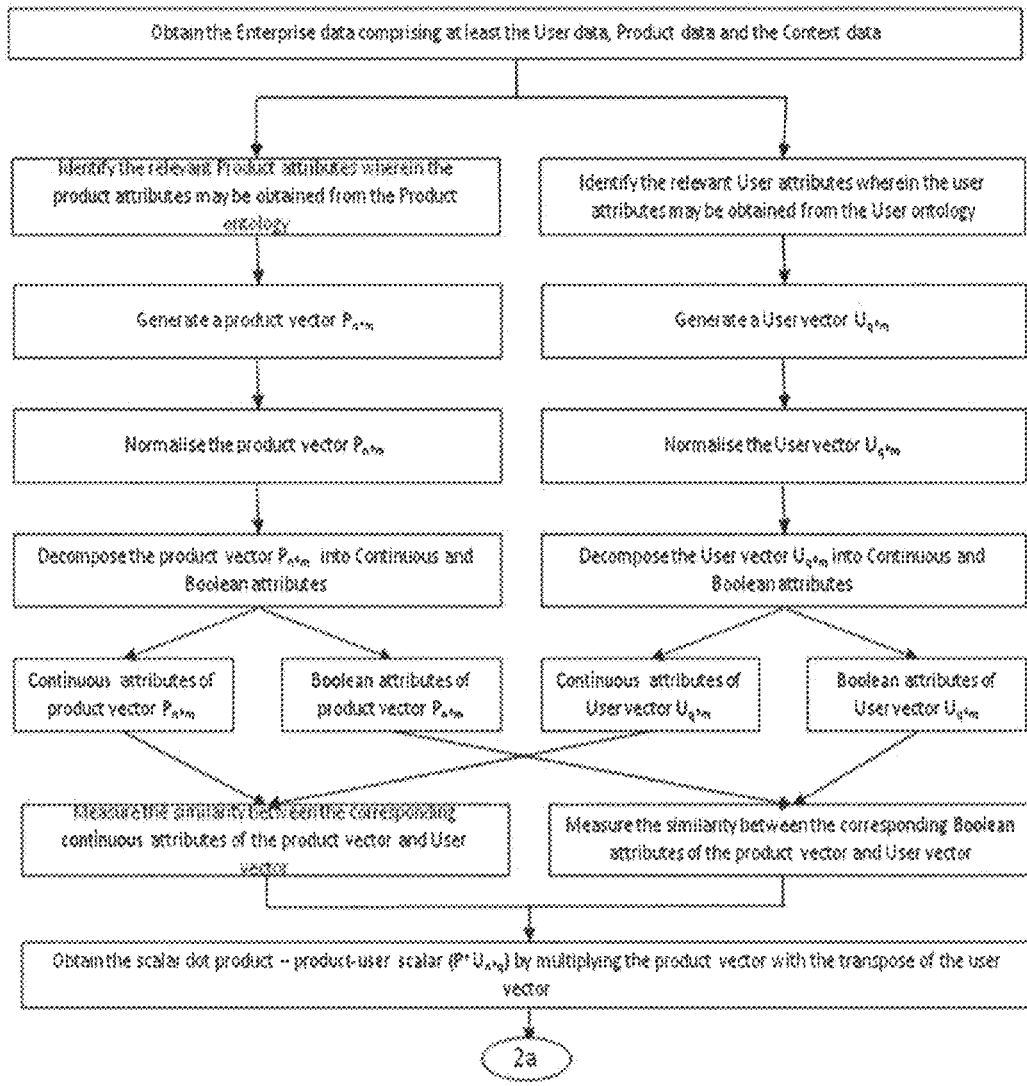
FIGS. 10a-10c illustrate a detailed process flow, in accordance with some embodiments of the present disclosure.
Figure 11:
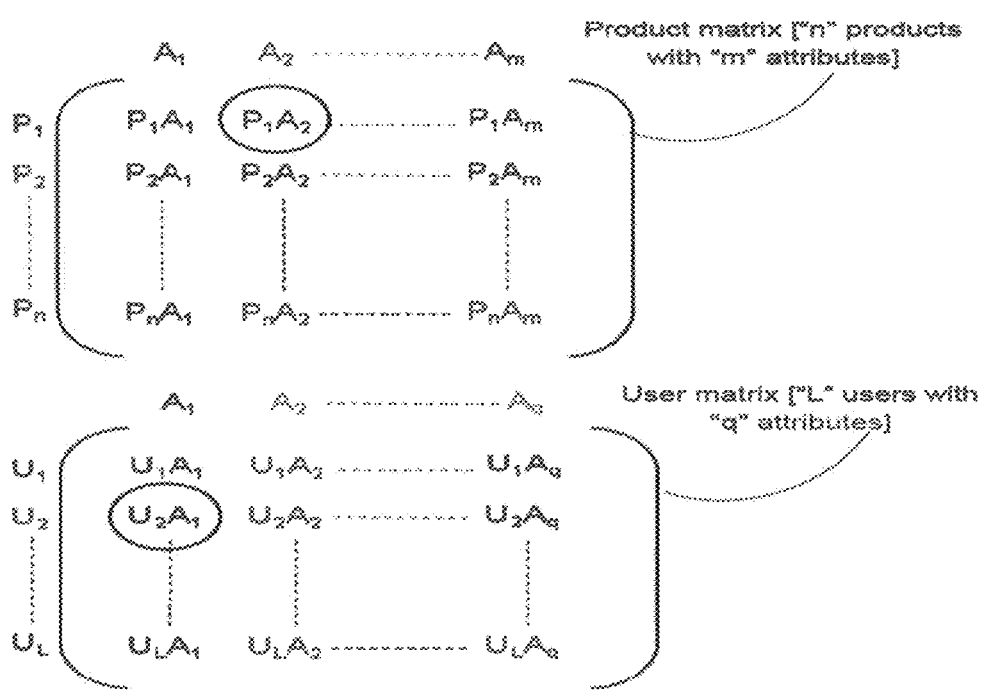
FIG. 11 illustrates an example of the Product matrix and User matrix comprising a product-vectors with m attributes and L user-vectors with q attributes respectively, in accordance with some embodiments of the present disclosure.

The FIG. 10a illustrates the process of generation of product-user scalar by using the data preparation service 216-A of the data processing module 216, in accordance with some embodiments of the present disclosure. The relevant user attributes and the product attributes are identified and a dynamic product-matrix and user-matrix are formed (as shown in FIG. 11, wherein P1A2 refers to the Data 3G/4G attribute (value 3G) of the product vector P1 and U2A1 refers to the Device type attribute (value 3G) of the user vector U2.) The two values are then normalized and decomposed to represent the value of each of these attributes as 1 for 3G and 0 for 4G. The similarity measure may then be computed using a customized similarity measure, based on the hamming distance measure, for example, $P_1A_2 \cdot U_2A_1 \square 1$ Besides, the system 102 may also handle high priority Boolean attributes by filtering out a set of products based on the high weightage, for example, roaming flag.

Further, the Similarity measure for Continuous attributes may be determined using a customized similarity score based on Euclidean distance measure. For example, Consider a SET A wherein set A comprises certain items 11, 12, 13, 14 and 15 that needs to be compared to a user vector [1, 200, 3]. This comparison is done by the data processing module 216 in which the user-vector and the product-vector are compared to generate a similarity score (i.e., a first similarity score). Then the given attributes are normalized (Result set before as well as after normalization have been shown below to depict the significance of Normalization) and the similarity score (first similarity score) is determined such that the products closer to the user preference 1, 2, 3 are considered to be more similar to the user vector and the recommendation may be generated accordingly.

Item 11: [1, 200, 3]
Item 12: [1, 200, 4]
Item 13: [1, 100, 5]
Item 14: [4, 800, 6]
Item 15: [5, 900, 7]
This is compared with user vector 1, 200, 3

| RESULTS before Normalization: | RESULTS after Normalization: |
|---|---|
| Similarity to 11: 1.0 | Similarity to 11: 1.0 |
| Similarity to 12: 1.0 | Similarity to 12: 1.0 |
| Similarity to 13: 0.02969709027303806 | Similarity to 13: 0.9928070949094878 |
| Similarity to 14: 0.004991555952739771 | Similarity to 14: 0.5358510460377532 |
| Similarity to 15: 0.004279461034728587 | Similarity to 15: 0.4271341127649537 |

Figure 10B:
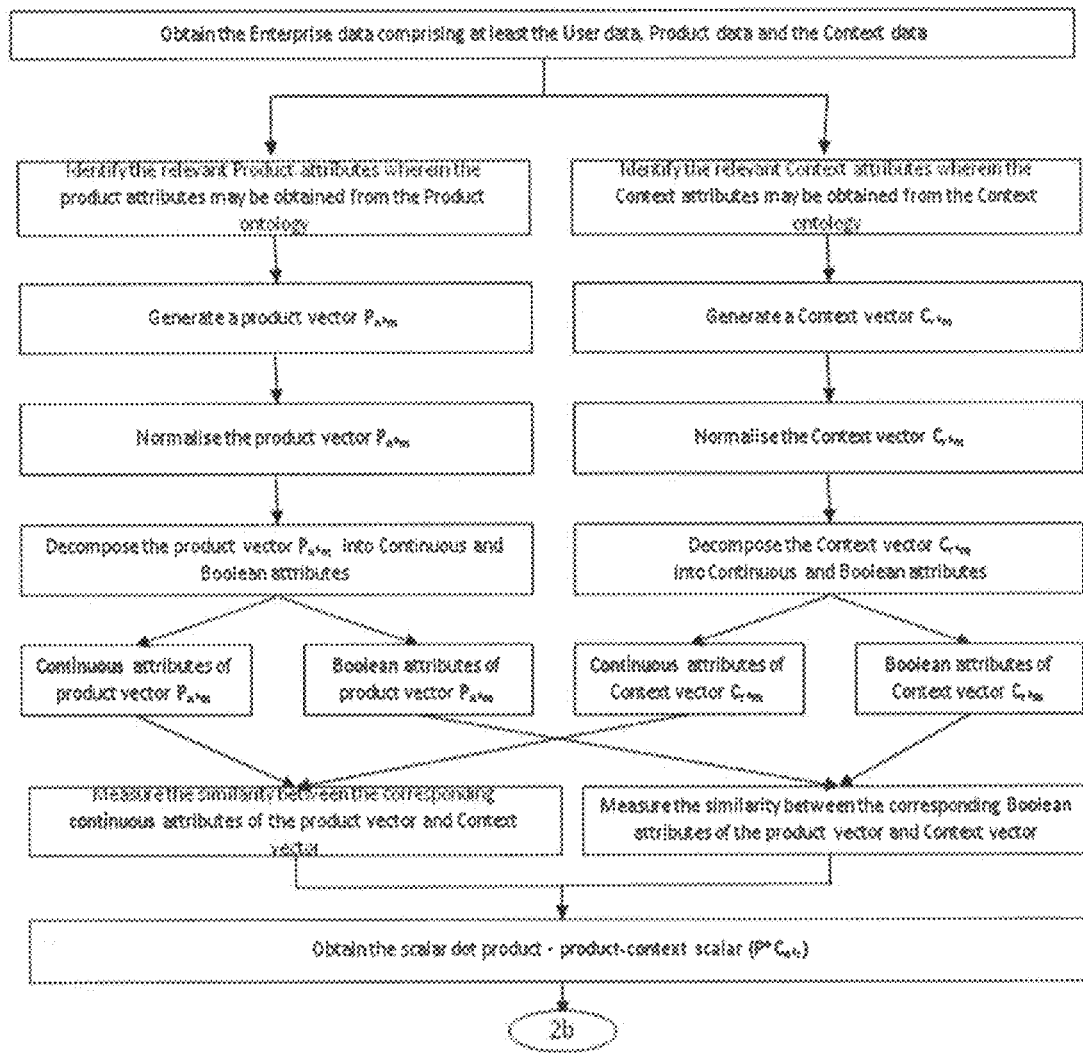

Now referring FIG. 10b which illustrates the process of generation of the product-context scalar by the data preparation service 216-A, in accordance with some embodiments of present disclosure. The relevant product attributes and the context attributes are identified and a dynamic product-matrix and the context-matrix are formed. The attributes are mapped to each other, and the relevant attributes are normalized, decomposed and then similarity measure between the Product Vector and Context Vector may be computed as follows:

$P_1A_2 * C_3A_2 \square 1$

Thus, the similarity measure i.e., the similarity score (second similarity score) is computed, by the data processing module 216, by comparing the above mentioned product-vector and the context-vector. For example, if the "Proximity location" attribute in both the product vector and the context vector is "Airport", then the corresponding similarity measure/score may be computed as 1 (second similarity score).

In the next step, after computing the first similarity score and the second similarity score, the data processing module 216 applies the second similarity score (i.e., the similarity score computed based on the comparison of the product-vector and the context-vector) on the Product User Scalar (P*$U_{n*q}$) to obtain the overall score viz. [P*U*C].

Thus, a score is determined after applying the context filter 216-B. The hyper-personalized recommendation generated may further be driven by the context, by a post-filtering approach. The context filter 216-B may be invoked by the context module 210 while generating a dynamic personalized recommendation set for the user. For example, the Data 3G/4G, Device type 3G and the Context Airport leads to an overall similarity score 1*1=1, and based on this score, the system 102 generates the recommendation as "International 3G roaming offer". In this manner, the applying of the context filter results in a reduced dimensionality matrix.

Further, a weightage may further be associated to each of the attributes related to the context, in order to provide a higher emphasis to relevant attributes while generating hyper-personalized recommendations for the users. The calculation of weightage may further be dynamic and vary from user-to-user which may be based on a pre-defined rule set. For example, a user travelling from Delhi to Mumbai should not receive an International roaming offer, as the context of travel is national/within country.

Further, the next service provided by the data processing module 216 is Data Indexer Indexing Service 216-C. This service facilitates the data to be indexed in the data repository 222 of the system 102. In one implementation, the data repository 222 may be represented as columnar tables pertaining to the product-data, context-data and user-data. The indexing, provided by the data indexing service 216-C, facilitates faster retrieval of required data for generating recommendations.

Figure 10C:
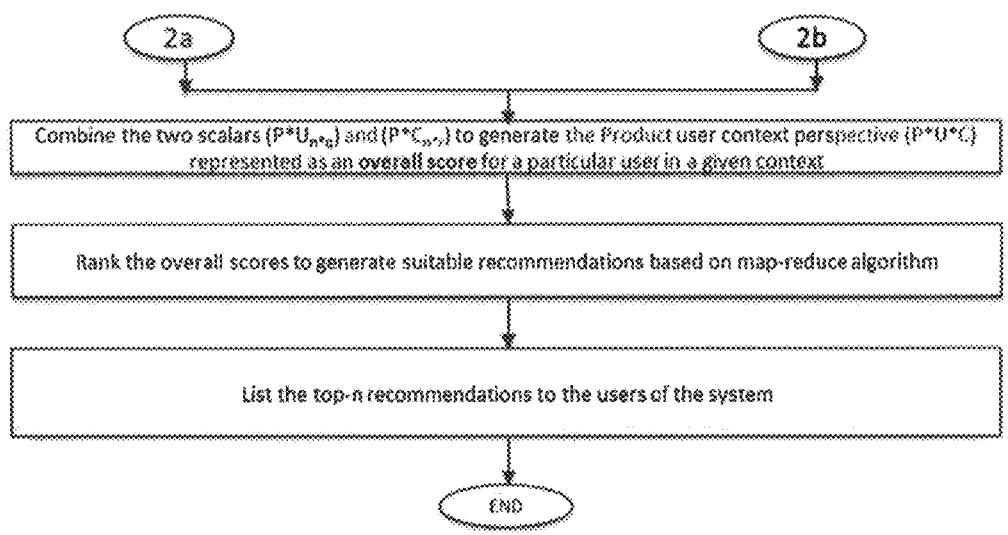

According to embodiments of present disclosure, a set of recommendations may be generated, by the recommendation module 218, based on the overall score computed by the data processing module 216 (as discussed above), based on the product-user-context [P*U*C] perspective. The process flow for generation of recommendation set based on the overall score has been illustrated in the FIG. 10c. Such recommendations may further be customized based on a pre-configured rule set, determined by the enterprise requirements, and the top-n recommendations may be provided to the customers. In one implementation, the context-specific recommendations and the user persona-specific recommendations may be provided, so that the user has a provision to select a recommendation(s) of his/her choice. In another implementation, the weightage given to both context and user persona may be generated dynamically based on Enterprise requirements. Based on which an integrated set of best-fit recommendations may be provided. Thus, the recommendation set may comprise one or more products, from the plurality of products, based on the overall score.

Some of the exemplary elucidations for the type of recommendations generated in the telecom sector, which illustrate the dynamicity of persona creation, dynamicity of context triggering and dynamicity of the products/partner products/offers selection, based on dynamic attributes/feature sets, are as follows,
 1. In case the user is a Facebook™ fan, and is currently at the railway station, the following inferences may be drawn:
    a) User is a Facebook™ persona, social media persona
    b) User may be travelling
 The recommendations may comprise the Facebook™ data pack, and a free WiFi connectivity offer, assuming equal weightage is given to both User persona and the Context,
 2. In case the user is a YouTube™ fan, and is entering a shopping mall.
 The fact that the user is more interested in shopping, and hence offers at the partner products in the Shopping mall are more relevant when compared to the YouTube™ persona. In this case, Context (shopping) is given higher weightage in comparison to the user persona (YouTube™ fan).
 3. The user is in the vicinity of Barista coffee shop, and is a cricket fan. However, he or she doesn't like Coffee.
 Once the user enters the coffee outlet, context is triggered which indicates that offers in Barista should be provided to the user. However, in case the past history of the user conveys that the user does not like coffee, it is irrelevant to provide offers on Coffee, and hence the recommendation will be generated based on the Sports persona (Cricket fan) by giving a higher weightage to user persona, and not the context. However, in case the user's history is not available in the system, the system 102 gives offers related to coffee, considering the context of recommendation.
 4. The user has been a Facebook™ fan in the past year, but has been browsing YouTube™ heavily in the past two weeks.
 Although the user history indicates that the user has been an ardent Facebook™ fan, the current persona indicates the user is watching videos on YouTube™, the recommendations may include offers on YouTube™ usage, as well as Facebook™, in that order. Hence, the current persona (YouTube™) is given higher weightage in comparison to historic persona (Facebook™ fan).

Those skilled in the art would appreciate that the historic persona may also influence the current persona, which may be used while predicting the user preferences and interests. For example, the history of the user indicates that he or she has been an ardent cricket fan for the past 4 years, however, in the past 3 weeks he or she has been browsing you tube heavily, the system 102 may infer that he or she may be watching live cricket matches on you tube and give recommendations pertaining to cricket or sports and not YouTube™. Thus, in case system 102 has the customer data for a very long period of time (say 3-4 years), the system 102 may retain the persona, while prioritizing the data of the current period to ensure higher relevance is given to the current user persona than the historic persona.

According to embodiments of present disclosure, the system 102 facilitates context chaining feature. By virtue of dynamicity in the contextual hyper-personalized recommendation system, the system 102 is capable of generating recommendations, not only based on the current activity/user persona/context of the user, but also based on a combination of the recent activities by context-chaining principle. For example, consider a scenario where John is watching Football match on TV. After a while, he leaves for college. He switches on his tablet/cell phone and gets a message "You were watching ManU v/s Liverpool match, do u want to continue watching?", and John replies affirmatively. In the above example, the system 102 may inter-relate the various contexts from watching a football match to going for college, and using tablet/cell phone. In the above example, the system 102 may offer free access to live HD streaming of football matches up to 5 GB.

Further, in case John is going to a nearby shopping mall, and chatting with his friends about the match on his phone, the system 102 may provide suggestions on offers related to branded partner products associated with the match. For example, in case John is a Manchester United fan, the system 102 may suggest the user to download ManuPromo voucher & Avail T-Shirt, Cap & Mug at XYZ mall, wherein the recommendation is related to the "Sports Persona", and free WiFi service at the XYZ mall, pertaining to the context. Further, such a context chaining facilitates the system 102 to traverse across devices and locations to determine context, in order to delight the user with context specific offers Further, in one of the embodiments, the products/offers which has minimal match with the existing dynamic persona's preferences may also be a part of the Recommendation set. The User persona may accordingly be modified based on such recommendations in a dynamic manner, thus capturing the various facets of the User Persona while generating recommendations.

Figure 8:
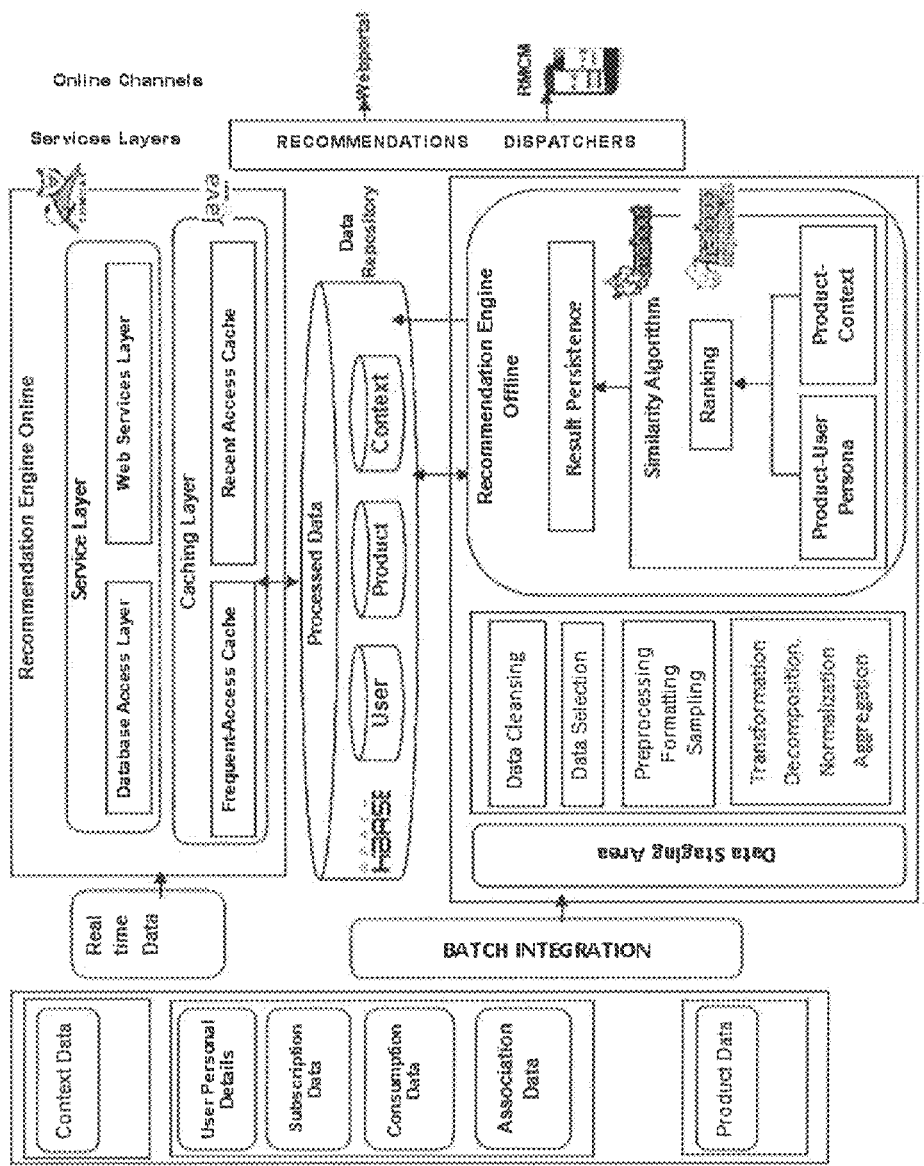
FIG. 8 illustrates technical architecture of the system, in accordance with some embodiments of the present disclosure.

Now referring to FIG. 8, technical architecture is illustrated, in accordance with some embodiments of present disclosure. In one implementation, the system 102 may implement distributed processing wherein the recommendation is generated based on the integrated output from multiple machines, thus enhancing the throughput time and reducing latency. For example, the system 102 (recommendation engine) may be based over hadoop distributed file system (HDFS) to handle distributed processing. The system 102 may further be devised to handle bulk data ingestion. In another implementation, the system 102 may leverage 'solr' based indexing mechanism. Further, Hive query language (QL) may be used for retrieving the data, and asynchronous web service/Java Message Service (JMS) may be used for asynchronous data update. The recommendations may be calculated by using a Mahout framework. Further, Map Reduce algorithms may be used to rank the recommendations generated by the system 102. According to an embodiment of present disclosure, the system 102 may also implement Apache Spark™ which provides faster in-memory processing for generating the recommendations. Further, according to other embodiments of present disclosure, the system 102 may also use the customized algorithms for sorting and ranking the recommendations based on the aforementioned logic. Further, the customized algorithms may also be used for filtering the set of recommendations for a final recommendation. However, it is to be noted that the technologies used herein are mere elucidations, and do not restrict the scope of the present disclosure.

Further referring back to FIG. 3, the system 102 comprises the analysis and metrics module 320, algorithm library 330, console visualization module 310 and administration module 340. Further, the analysis and metrics module 320 performs analytical tasks associated with the user persona generation, context-data processing and product-data processing. The analytical tasks may comprise finding value ranges of different attributes and deriving and storing the normalization parameters for downstream processes. According to embodiments of present disclosure, the analysis and metrics module 320 may also be involved in the pattern discovery tasks like analyzing and storing the results of customer segmentation, product segmentation, and temporal aspects discovery and the like. Further, the algorithm library 330 acts as a repository for referencing a set of computational algorithms required at different stages of processing. For example, the system 102 may refer to the algorithm library 330 for selecting a best algorithm amongst the set of algorithms. The algorithm library 330 may include, but not limited to, algorithms in different categories like clustering algorithms, classification algorithms and dimensionality reduction algorithm. Further, the clustering algorithms may comprise k-means, density-based spatial clustering of applications with noise (DBSCAN), hierarchical and expectation-maximization (EM) algorithm. Further, the classification algorithm may comprise decision trees, random forest, k nearest neighbor, support vector machines. Further, the dimensionality reduction algorithm may comprise principal component analysis, and latent discriminant analysis. In one embodiment, the customized algorithm (for sorting and ranking the recommendations) may also be stored in the algorithm library 330. Further, the console and visualization module 310 provides an interface for monitoring different processes involved like user-persona generation, context switching and recommendation generation. Further, the administration module 340 comprises number of functionalities which customizes the working of the system 102 based on requirements/custom needs. These functionalities may include, but not limited to, selection of the attributes and weightage of each attributes, running the recommendation for entire user base versus group of users, configuring the data processing engines like Apache Spark™ or Map Reduce, configuring algorithm of choice like content based versus collaborative versus hybrid, configuring job scheduling parameters like the frequency of run, and configuring cache eviction strategies.

Figure 9:
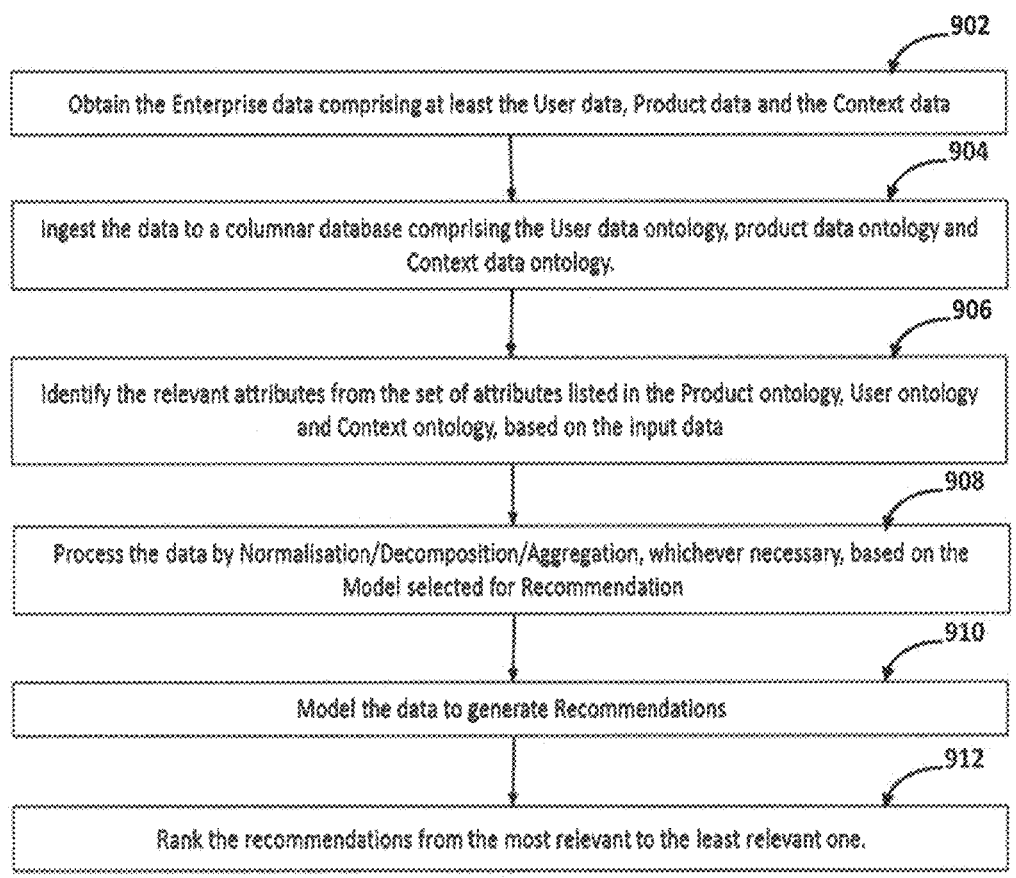
FIG. 9 illustrates a method for providing context-driven hyper-personalized recommendations, in accordance with some embodiments of the present disclosure.

Referring now to FIG. 9, the method/process flow for generating the context-driven hyper-personalized recommendation engine is shown, in accordance with some embodiments of the present disclosure. The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communications network. In a distributed computing environment, computer executable instructions may be located in both local and remote computer storage media, including memory storage devices.

The order in which the method 900 is described is not intended to be construed as a limitation, and any number of the described method blocks can be combined in any order to implement the method 900 or alternate methods. Additionally, individual blocks may be deleted from the method 900 without departing from the spirit and scope of the subject matter described herein. Furthermore, the method can be implemented in any suitable hardware, software, firmware, or combination thereof. However, for ease of explanation, in the embodiments described below, the method 900 may be considered to be implemented in the above described system 102.

At block 902, user-data, product-data and context-data may be dynamically captured. Further, the user-data and the context-data are captured based on at least one of past activities of a user, current activities of the user and a time of occurrence of an event. Further, the product-data is captured corresponding to a plurality of products to be recommended to the user.

At block 904, user-data ontology, product-data ontology and context-data ontology is generated based on the user-data, the product-data and the context-data respectively.

At block 906, user-attributes, product-attributes and context-attributes may be selected from the user-data ontology, the product-data ontology and the context-data ontology respectively.

At block 908, the user-attributes, the product-attributes and the context-attributes, selected in the above block 906, are normalized. Further, the user-attributes, the product-attributes and the context-attributes, after being normalized, are decomposed into Boolean and continuous values thereby forming the user vectors, the product-vectors and the context-vectors respectively.

At block 910, the user-vectors, the product-vectors and the context-vectors are modeled to generate a recommendation. These data are modeled by performing following steps. In a first step, a user-vector and a product-vector is compared to generate a first similarity score. In second step, a product-vector and a context-vector is compared to generate a second similarity score. In third step, an overall score is computed based on the first similarity score and the second similarity score. In the fourth step, a recommendation set is generated, comprising one or more products, from the plurality of products, based on the overall score. The modeled data 226 is stored in the data repository 222 of the system 102, as shown in the FIG. 4.

At block 912, the recommendation set generated may be ranked in order to recommend most relevant products to the user.

According to an embodiment of present disclosure, the exemplary elucidation of the Context-driven hyper-personalized Recommendation system has been is explained below. Consider that the user has rank "YouTube™"☐ Netflix™☐Sports. Further, in the below table, data consumption by the user for the above options are shown.

| YouTube ™ fan | Streaming Netflix ™ fan | Sports fan |
|---|---|---|
| 70 | 45 | 10 |

Further, the system 102 may represent the user attributes as boolean (Y/N) for a particular persona. So in this case suppose the User vector is (Yt,Nf,Sp)☐1, 1, 0 as shown in below table.

| User | YouTube | Netflix | Sports |
|---|---|---|---|
| U | 1 | 1 | 0 |

From the above table, considering 2 products with similar attributes as shown below.

| Product | YouTube | Netflix | Sports |
|---|---|---|---|
| P1 | 1 | 0 | 0 |
| P2 | 0 | 1 | 0 |
| P3 | 0 | 0 | 1 |

On measuring the similarity measure for the products P1 and P2, of the above table, will stand out. Suppose the similarity measure is as follows.

| User-Product | Similarity |
|---|---|
| U-P1 | 0.6 |
| U-P2 | 0.6 |
| U-P3 | 0.2 |

Now, the user rank for each persona may be applied on the above similarity measure (based on the below calculation)

Final $U\text{-}P1 = 0.6*(1*70+0*45) = 4.2$; and

Final $U\text{-}P2 = 0.6*(0*70+1*45) = 2.4$.

Although implementations for methods and system 102 for facilitating providing context-driven hyper-personalized recommendation have been described in language specific to structural features and/or methods, it is to be understood that the appended claims are not necessarily limited to the specific features or methods described. Rather, the specific features and methods are disclosed as examples of implementations for providing context-driven hyper-personalized recommendation.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method for generating a context-driven hyper-personalized recommendation, the method comprising:

capturing, by one or more hardware processors, user-data, product-data and context-data dynamically, wherein the user-data and the context-data is captured based on at least one of past activities of a user, current activities of the user and a time of occurrence of an event and wherein the product-data is captured corresponding to a plurality of products to be recommended to the user, wherein the context-data is directly used from an in-memory cache while generating the context-driven hyper-personalized recommendation;

generating, by the one or more hardware processors, user-data ontology, product-data ontology and context-data ontology based on the user-data, the product-data and the context-data respectively, wherein the user-data, the product-data and the context-data are represented in a columnar database;

preparing, by the one or more hardware processors, multi-dimensional user-matrix, product-matrix and context-matrix comprising user-vectors, product-vectors and context-vectors respectively, based on the user-data ontology, the product-data ontology and the context-data ontology respectively;

comparing, by the one or more hardware processors,
   a user-vector and a product-vector in order to generate a first similarity score, and
   a product-vector and a context-vector in order to generate a second similarity score;

computing, by the one or more hardware processors, an overall score based on the first similarity score and the second similarity score; and generating, by the one or more hardware processors, a recommendation set comprising one or more products, from the plurality of products, based on the overall score.

2. The method of claim 1, wherein the user-data, the product-data and the context-data are captured from data sources comprising at least one of the data sources related to an Enterprise, one or more partners associated with the enterprise and social data, and wherein the product-data is associated with products, services and offerings.

3. The method of claim 1, further comprising generating a User persona for the context-driven hyper-personalized recommendation, wherein the User Persona is generated based on the user-data, and wherein the user-data comprises at least the personal details of the User and association data, consumption data and subscription data obtained from the data sources.

4. The method of claim 3, wherein the overall score is computed by assigning a dynamic weightage to the first similarity score and the second similarity score, based on the User Persona and the Context-vector.

5. The method of claim 1, wherein the multi-dimensional user-matrix, product-matrix and context-matrix is prepared by:
  selecting, by the processor, user-attributes, product-attributes and context-attributes, based on the user-data ontology, the product-data ontology and the context-data ontology respectively;
  normalizing, by the processor, the user-attribute the product-attributes and the context-attributes; and
  decomposing, by the processor, the user-attributes, the product-attributes and the context-attributes, after being normalized, into boolean and continuous values thereby forming the user vectors, the product-vectors and the context-vectors.

6. The method of claim 5, wherein the comparing further comprises:
  mapping at least one user-attribute in the user-vector to the corresponding product-attribute in the product-vector based on a pre-configured rule set; and
  mapping at least one product-attribute in the product-vector to the corresponding context-attribute in the context-vector based on the pre-configured rule set.

7. A system for generating a context-driven hyper-personalized recommendation, the system comprises:
  a processor;
  a memory coupled with the processor, wherein the memory has a plurality of modules stored therein that are executable by the processor, the plurality of modules comprising:
    a data ingestion module to capture user-data, product-data and context-data dynamically, wherein the user-data and the context-data is captured based on at least one of past activities of a user, current activities of the user and a time of occurrence of an event, and wherein the product-data is captured corresponding to a plurality of products to be recommended to the user, wherein the context-data is directly used from an in-memory cache while generating the context-driven hyper-personalized recommendation;
    an ontology builder module to generate user-data ontology, product-data ontology and context-data ontology based on the user-data, the product-data and the context-data respectively, wherein the user-data, the product-data and the context-data are represented in a columnar database;
    a data processing module to
      prepare multi-dimensional user-matrix, product-matrix and context-matrix comprising user-vectors, product-vectors and context-vectors respectively, based on the user-data ontology, the product-data ontology and the context-data ontology respectively,
      compare a user-vector and a product-vector in order to generate a first similarity score,
      compare a product-vector and a context-vector in order to generate a second similarity score and
      compute an overall score based on the first similarity score and the second similarity score; and
    a recommendation module to generate a recommendation set comprising one or more products, from the plurality of products, based on the overall score.

8. The system of claim 7, wherein the user-data, the product-data and the context-data is captured from data sources comprising at least one of the data sources related to an Enterprise, one or more partner associated with the enterprise, and social data, and wherein the product-data is associated with products, services and offerings.

9. The system of claim 7, wherein the Ontology Builder Module further generates a User persona for the context-driven hyper-personalized recommendation, wherein the User Persona is generated based on the user-data, and wherein the user-data comprises at least the personal details of the User, association data, consumption data and subscription data obtained from the data sources.

10. The system of claim 9, wherein the data processing module computes the overall score by assigning a dynamic weightage to the first similarity score and the second similarity score, based on the User Persona and the Context-vector.

11. The system of claim 7, wherein the data processing module compares by;
  mapping at least one user-attribute in the user-vector to the corresponding product-attribute in the product-vector based on a pre-configured rule set; and
  mapping at least one product-attribute in the product-vector to the corresponding context-attribute in the context-vector based on the pre-configured rule set.

12. A non-transitory computer readable medium embodying a program executable in a computing device for generating a context-driven hyper-personalized recommendation, the program comprising:
  a program code for capturing user-data, product-data and context-data dynamically, wherein the user-data and the context-data is captured based on at least one of the past activities of a user, current activities of the user and a time of occurrence of an event and wherein the product-data is captured corresponding to a plurality of products to be recommended to the user, wherein the context-data is directly used from an in-memory cache while generating the context-driven hyper-personalized recommendation;
  a program code for generating user-data ontology, product-data ontology and context-data ontology based on the user-data, the product-data and the context-data respectively, wherein the user-data, the product-data and the context-data are represented in a columnar database;
  a program code for preparing multi-dimensional user-matrix, product-matrix and context-matrix comprising user-vectors, product-vectors and context-vectors respectively, based on the user-data ontology, the product-data ontology and the context-data ontology respectively;

a program code for comparing:
- a user-vector and a product-vector in order to generate a first similarity score, and
- a product-vector and a context-vector in order to generate a second similarity score;

a program code for computing an overall score based on the first similarity score and the second similarity score; and a program code for generating a recommendation set comprising one or more products, from the plurality of products, based on the overall score.

* * * * *